United States Patent
Hanai

(10) Patent No.: US 12,001,734 B2
(45) Date of Patent: Jun. 4, 2024

(54) INFORMATION PROCESSING APPARATUS, METHOD FOR CONTROLLING INFORMATION PROCESSING APPARATUS, AND NONVOLATILE STORAGE MEDIUM

(71) Applicant: CANON KABUSHIKI KAISHA, Tokyo (JP)

(72) Inventor: Hiroaki Hanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/463,972

(22) Filed: Sep. 8, 2023

(65) Prior Publication Data

US 2024/0086122 A1    Mar. 14, 2024

(30) Foreign Application Priority Data

Sep. 9, 2022  (JP) ................. 2022-143536

(51) Int. Cl.
    *G06F 3/12* (2006.01)
(52) U.S. Cl.
    CPC .......... *G06F 3/1229* (2013.01); *G06F 3/1205* (2013.01); *G06F 3/1259* (2013.01)
(58) Field of Classification Search
    CPC ..... G06F 3/1229; G06F 3/1205; G06F 3/1259
    See application file for complete search history.

(56) References Cited

U.S. PATENT DOCUMENTS

| 2004/0184043 A1* | 9/2004 | Hirosugi | ............. B41J 2/04586 |
| | | | 358/1.15 |
| 2010/0265540 A1* | 10/2010 | Sato | ..................... G06F 3/1288 |
| | | | 358/1.15 |
| 2020/0004473 A1 | 1/2020 | Saigusa | |

FOREIGN PATENT DOCUMENTS

| EP | 3859515 A1 | 8/2021 |
| JP | 2021124791 A | 8/2021 |

* cited by examiner

*Primary Examiner* — Quang N Vo
(74) *Attorney, Agent, or Firm* — Canon U.S.A., Inc. IP Division

(57) ABSTRACT

An application to be stored in a nonvolatile storage medium according to an embodiment of the present invention is a print setting application to be installed in an information processing apparatus, the application when executed on the information processing apparatus causes the information processing apparatus to: acquire a printing method of a printer; acquire, in a case where the acquired printing method is a first method, printer information regarding a predetermined item; and display an object based on the acquired printer information on a display, wherein, in a case where the acquired printing method is a second method, the information processing apparatus does not acquire the printer information regarding the predetermined item.

17 Claims, 35 Drawing Sheets

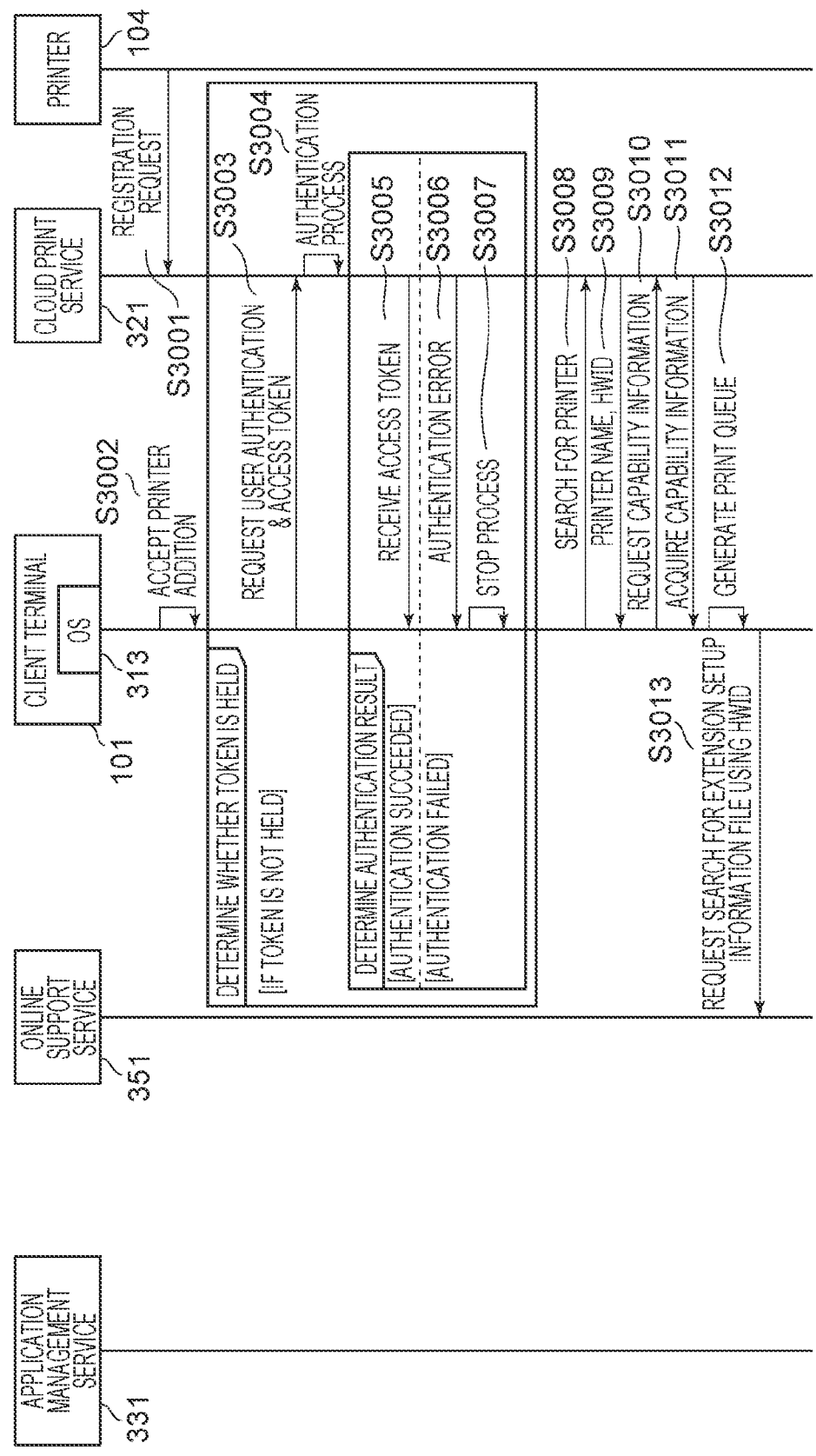

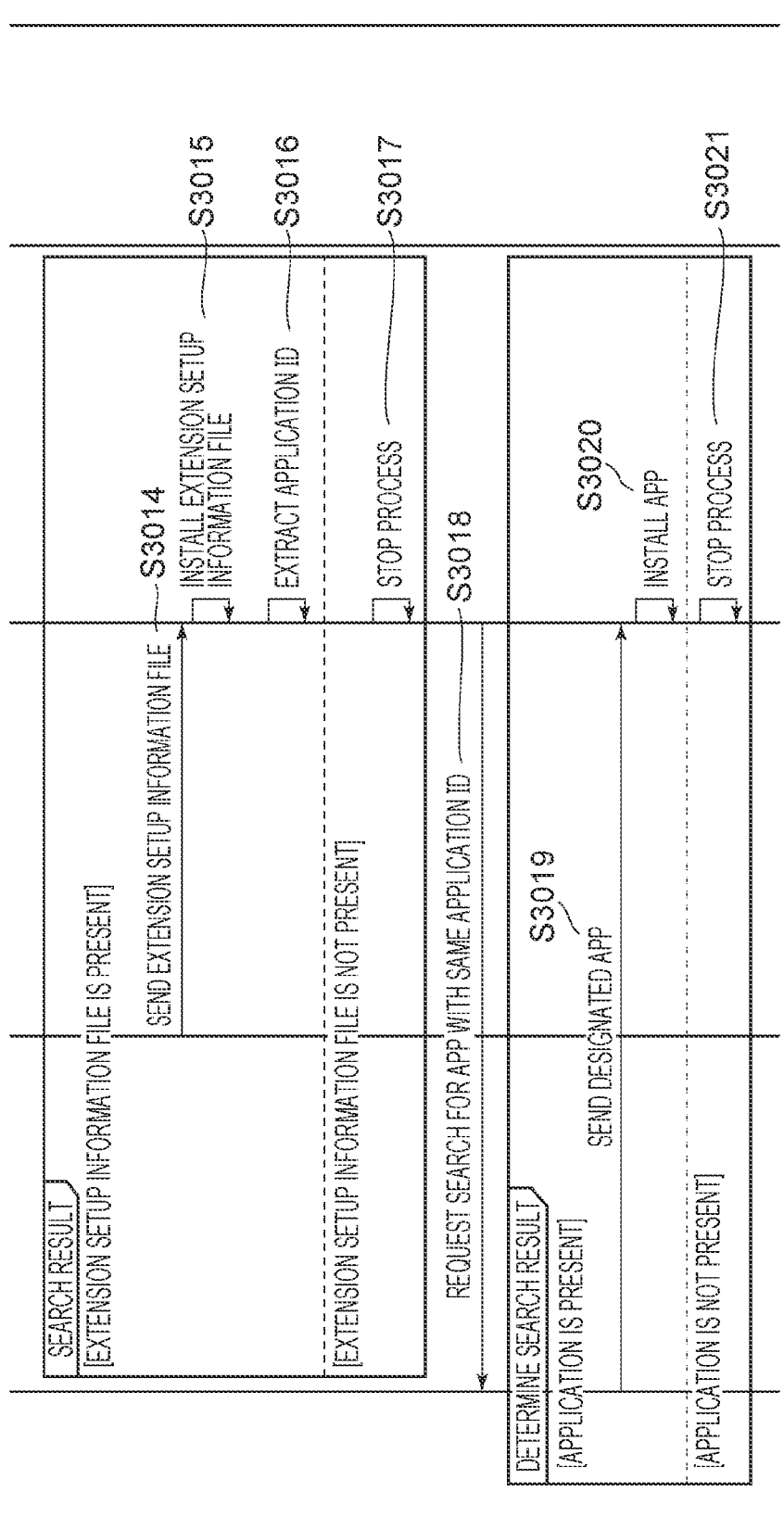

FIG. 5A

| ITEM NAME | ATTRIBUTE |
|---|---|
| PAPER SIZE | A6/A5/A4/B5/Letter/Legal/Executive/POSTCARD/#10 Envelope VERTICAL/ DL Envelope VERTICAL/ENVELOPE (WESTERN STYLE NO. 4) VERTICAL/ ENVELOPE (LONG NO. 3) VERTICAL/ENVELOPE (LONG NO. 4) VERTICAL/ ENVELOPE Envelope C5 VERTICAL/ENVELOPE Envelope Monarch VERTICAL/ L/4×6 (KG SIZE)/5×7/SIX CUTS (8×10)/SQUARE (127 mm)/ VISITING CARD (Card)/ENVELOPE (WESTERN STYLE NO. 6) VERTICAL/ MULTIPURPOSE TRAY 120×120 mm/SQUARE (4×4) |
| PAPER TYPE | ENVELOPE/LABEL/PLAIN PAPER/PHOTO PAPER/THIN PAPER/ CARDBOARD/BOND PAPER/OHP/PHOTO PAPER GLOSSY, STANDARD/ PHOTO PAPER SILK TEXTURE/INK-JET POSTCARD (MESSAGE SIDE)/ INK-JET POSTCARD (ADDRESS SIDE)/ INK-JET PHOTO POSTCARD (MESSAGE SIDE)/ INK-JET PHOTO POSTCARD (ADDRESS SIDE) |
| NUMBER OF COPIES | Max=99 |
| ORIENTATION | PORTRAIT/LANDSCAPE |
| PRINT QUALITY | FINE/STANDARD/DRAFT |
| PRINT BY NUMBER OF COPIES | ON/OFF |
| COLOR MODE | COLOR/BLACK AND WHITE |
| PRINT FROM LAST PAGE | ON/OFF |
| LAYOUT | FROM LEFT TO RIGHT/FROM RIGHT TO LEFT |
| SCALING | NONE/FIT TO PAGE WIDTH/FIT TO SCREEN SIZE |
| 2-SIDED PRINTING | 1-SIDED/2-SIDED |
| BINDING LOCATION | LONG EDGE/SHORT EDGE |
| ROTATE 180° | NONE/TO LEFT/TO RIGHT |
| MARGINLESS PRINTING | ON/OFF |

FIG. 5B

| ITEM NAME | ATTRIBUTE |
|---|---|
| PAPER SIZE | A6/A5/A4/A3/B5/B4/Letter/Legal/Executive/POSTCARD/#10 Envelope VERTICAL/ DL Envelope VERTICAL/ENVELOPE (LONG NO. 4) VERTICAL/ ENVELOPE (LONG NO. 3) VERTICAL/ENVELOPE (LONG NO. 4) VERTICAL/ ENVELOPE Envelope C5 VERTICAL/ENVELOPE Envelope Monarch VERTICAL/ L/4×6 (KG SIZE)/5×7/POSTCARD/12×18/SRA3 |
| PAPER TYPE | ENVELOPE/LABEL/PLAIN PAPER/PHOTO PAPER/THIN PAPER/CARDBOARD/ BOND PAPER/OHP |
| NUMBER OF COPIES | Max=9999 |
| ORIENTATION | PORTRAIT/LANDSCAPE |
| PRINT QUALITY | STANDARD/DRAFT |
| PRINT BY NUMBER OF COPIES | ON/OFF |
| STAPLING | NONE/AUTOMATIC/UPPER LEFT/LOWER LEFT/UPPER RIGHT/LOWER RIGHT/ LEFT EDGE (TWO-POINT BINDING)/UPPER EDGE (TWO-POINT BINDING)/ RIGHT EDGE (TWO-POINT BINDING)/LOWER EDGE (TWO-POINT BINDING)/ SADDLE-STITCH BINDING/ PERFECT BINDING |
| PUNCHING | NONE/PUNCHING HOLE (AUTOMATIC)/PUNCHING HOLE (2 HOLES LEFT)/ PUNCHING HOLE (3 HOLES LEFT)/PUNCHING HOLE (4 HOLES LEFT)/ PUNCHING HOLE (MULTIPLE LEFT)/PUNCHING HOLE (2 HOLES RIGHT)/ PUNCHING HOLE (3 HOLES RIGHT)/PUNCHING HOLE (4 HOLES RIGHT)/ PUNCHING HOLE (MULTIPLE RIGHT)/PUNCHING HOLE (2 HOLES UPPER)/ PUNCHING HOLE (3 HOLES UPPER)/PUNCHING HOLE (4 HOLES UPPER)/ PUNCHING HOLE (MULTIPLE UPPER)/PUNCHING HOLE (2 HOLES LOWER)/ PUNCHING HOLE (3 HOLES LOWER)/PUNCHING HOLE (4 HOLES LOWER)/ PUNCHING HOLE (MULTIPLE LOWER) |
| FOLDING | NONE/TWO-FOLD/C-HOLD/FOUR-HOLD/OUTWARD THREE-FOLD/Z-HOLD/ SADDLE-HOLD (OUTPUT FROM SADDLE FINNISHER) |
| COLOR MODE | COLOR/BLACK AND WHITE |
| PER PAGE SETTING | OFF/2in1/4in1/6in1/9in1/16in1 |
| LAYOUT | FROM LEFT TO RIGHT/FROM RIGHT TO LEFT |
| SCALING | NONE/FIT TO PAGE WIDTH/FIT TO SCREEN SIZE |
| 2-SIDED PRINTING | 1-SIDED/2-SIDED |
| BINDING LOCATION | LONG EDGE/SHORT EDGE |
| ROTATE 180° | NONE/TO LEFT/TO RIGHT |
| STORE JOB IN PRINTER | ON/OFF |
| ABBREVIATE JOB NAME | ON/OFF |

FIG. 6A-1

```
<?xml version="1.0" encoding="utf-8"?>
<PrintDeviceCapabilities
xmlns:xsi="http://www.w3.org/2001/XMLSchema-instance"
xmlns:xsd="http://www.w3.org/2001/XMLSchema"
xmlns:xml="http://www.w3.org/XML/1998/namespace"
xmlns:psk="http://schemas.microsoft.com/windows/2003/08/printing/printschemakeywords"
xmlns:psk12="http://schemas.microsoft.com/windows/2013/12/printing/printschemakeywordsv12"
xmlns:psf="http://schemas.microsoft.com/windows/2003/08/printing/printschemaframework"
xmlns:psf2="http://schemas.microsoft.com/windows/2013/12/printing/printschemaframework2"
xmlns="http://schemas.microsoft.com/windows/2013/12/printing/printschemaframework2"
version="2">

<psk:JobCopiesAllDocuments psf2:psftype="ParameterDef">
  <psf:DataType xsi:type="xsd:QName" psf2:psftype="Property">xsd:integer</psf:DataType>
  <psf:DefaultValue xsi:type="xsd:integer" psf2:psftype="Property">1</psf:DefaultValue>
  <psf:Mandatory xsi:type="xsd:QName" psf2:psftype="Property">psk:Unconditional</psf:Mandatory>
  <psf:MaxValue xsi:type="xsd:integer" psf2:psftype="Property">999</psf:MaxValue>
  <psf:MinValue xsi:type="xsd:integer" psf2:psftype="Property">1</psf:MinValue>
  <psf:Multiple xsi:type="xsd:integer" psf2:psftype="Property">1</psf:Multiple>
  <psf:UnitType xsi:type="xsd:string" psf2:psftype="Property">copies</psf:UnitType>
</psk:JobCopiesAllDocuments>
```

FROM FIG. 6A-1

```
<psk:PageMediaSize psf2:psftype="Feature">
    <psk:ISOA4 psf2:psftype="Option">
        <psk12:PortraitImageableSize xsi:type="psf2:ImageableAreaType" psf2:psftype="Property">
            <psk:MediaSizeHeight xsi:type="xsd:integer" psf2:psftype="ScoredProperty">297000</psk:MediaSizeHeight>
            <psk:MediaSizeWidth xsi:type="xsd:integer" psf2:psftype="ScoredProperty">210000</psk:MediaSizeWidth>
        </psk12:PortraitImageableSize>184600,271600
    </psk:ISOA4>
    <psk:NorthAmericaLetter psf2:psftype="Option" psf2:default="true">
        <psk12:PortraitImageableSize xsi:type="psf2:ImageableAreaType" psf2:psftype="Property">
            <psk:MediaSizeHeight xsi:type="xsd:integer" psf2:psftype="ScoredProperty">279400</psk:MediaSizeHeight>
            <psk:MediaSizeWidth xsi:type="xsd:integer" psf2:psftype="ScoredProperty">215900</psk:MediaSizeWidth>
        </psk12:PortraitImageableSize>190500,254000
    </psk:NorthAmericaLetter>
</psk:PageMediaSize>

<psk:PageOrientation psf2:psftype="Feature">
    <psk:Landscape psf2:psftype="Option"/>
    <psk:Portrait psf2:psftype="Option" psf2:default="true"/>
</psk:PageOrientation>
……

<psk:PageOutputColor psf2:psftype="Feature">
    <psk:Color psf2:psftype="Option" psf2:default="true">
        <psk:DeviceBitsPerPixel xsi:type="xsd:integer" psf2:psftype="ScoredProperty">24</psk:DeviceBitsPerPixel>
        <psk:DriverBitsPerPixel xsi:type="xsd:integer" psf2:psftype="ScoredProperty">24</psk:DriverBitsPerPixel>
    </psk:Color>
</psk:PageOutputColor>
</PrintDeviceCapabilities>
```

```xml
<?xml version="1.0" encoding="UTF-8"?>
<PrintDeviceCapabilities
  xmlns:ns0000="http://schemas.microsoft.com/windows/2018/04/printing/printschemakeywords/Ipp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<!-- copies-default, copies-supported -->
  <psk:JobCopiesAllDocuments psf2:psftype="Property">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>
```

TO FIG. 6B-2

FIG. 6B-2    FROM FIG. 6B-1    TO FIG. 6B-3

```xml
<!-- media-default, media-supported, media-col-database -->
<psk:PageMediaSize psf2:psftype="Feature">
  <psk:JapanHagakiPostcard psf2:psftype="Option" psf2:default="false">
    <psk:MediaSizeWidth xsi:type="xsd:integer" psf2:psftype="ScoredProperty">100000</psk:MediaSizeWidth>
    <psk:MediaSizeHeight xsi:type="xsd:integer" psf2:psftype="ScoredProperty">148000</psk:MediaSizeHeight>
    <psk12:PortraitImageableSize xsi:type="psf2:ImageableAreaType" psf2:psftype="Property">3400,5000,93200,138000</psk12:PortraitImageableSize>
    <psk12:BorderlessImageableSize xsi:type="psf2:ImageableAreaType" psf2:psftype="Property">0,0,100000,148000</psk12:BorderlessImageableSize>
  </psk:JapanHagakiPostcard>
  <psk:ISOA5 psf2:psftype="Option" psf2:default="false">
    <psk:MediaSizeWidth xsi:type="xsd:integer" psf2:psftype="ScoredProperty">148000</psk:MediaSizeWidth>
    <psk:MediaSizeHeight xsi:type="xsd:integer" psf2:psftype="ScoredProperty">210000</psk:MediaSizeHeight>
    <psk12:PortraitImageableSize xsi:type="psf2:ImageableAreaType" psf2:psftype="Property">3400,5000,141200,200000</psk12:PortraitImageableSize>
    <psk12:BorderlessImageableSize xsi:type="psf2:ImageableAreaType" psf2:psftype="Property">0,0,148000,210000</psk12:BorderlessImageableSize>
  </psk:ISOA5>
  <psk:ISOA4 psf2:psftype="Option" psf2:default="false">
    <psk:MediaSizeWidth xsi:type="xsd:integer" psf2:psftype="ScoredProperty">210000</psk:MediaSizeWidth>
    <psk:MediaSizeHeight xsi:type="xsd:integer" psf2:psftype="ScoredProperty">297000</psk:MediaSizeHeight>
    <psk12:PortraitImageableSize xsi:type="psf2:ImageableAreaType" psf2:psftype="Property">3400,5000,203200,287000</psk12:PortraitImageableSize>
    <psk12:BorderlessImageableSize xsi:type="psf2:ImageableAreaType" psf2:psftype="Property">0,0,210000,297000</psk12:BorderlessImageableSize>
  </psk:ISOA4>
  <psk:NorthAmericaLetter psf2:psftype="Option" psf2:default="true">
    <psk:MediaSizeWidth xsi:type="xsd:integer" psf2:psftype="ScoredProperty">215900</psk:MediaSizeWidth>
    <psk:MediaSizeHeight xsi:type="xsd:integer" psf2:psftype="ScoredProperty">279400</psk:MediaSizeHeight>
    <psk12:PortraitImageableSize xsi:type="psf2:ImageableAreaType" psf2:psftype="Property">6400,5000,203200,269400</psk12:PortraitImageableSize>
    <psk12:BorderlessImageableSize xsi:type="psf2:ImageableAreaType" psf2:psftype="Property">0,0,215900,279400</psk12:BorderlessImageableSize>
```

FROM FIG. 6B-2

```
</psk:NorthAmericaLetter>
<psk:JapanYou4Envelope psf2:psftype="Option" psf2:default="false">
  <psk:MediaSizeWidth xsi:type="xsd:integer" psf2:psftype="ScoredProperty">105000</psk:MediaSizeWidth>
  <psk:MediaSizeHeight xsi:type="xsd:integer" psf2:psftype="ScoredProperty">235000</psk:MediaSizeHeight>
  <psk12:PortraitImageableSize xsi:type="psf2:ImageableAreaType" psf2:psftype="Property">5600,8000,93800,214300</psk12:PortraitImageableSize>
  <psk12:BorderlessImageableSize xsi:type="psf2:ImageableAreaType" psf2:psftype="Property">0,0,105000,235000</psk12:BorderlessImageableSize>
</psk:JapanYou4Envelope>
<psk:NorthAmericaLegal psf2:psftype="Option" psf2:default="false">
  <psk:MediaSizeWidth xsi:type="xsd:integer" psf2:psftype="ScoredProperty">215900</psk:MediaSizeWidth>
  <psk:MediaSizeHeight xsi:type="xsd:integer" psf2:psftype="ScoredProperty">355600</psk:MediaSizeHeight>
  <psk12:PortraitImageableSize xsi:type="psf2:ImageableAreaType" psf2:psftype="Property">6400,5000,203200,345600</psk12:PortraitImageableSize>
  <psk12:BorderlessImageableSize xsi:type="psf2:ImageableAreaType" psf2:psftype="Property">0,0,215900,355600</psk12:BorderlessImageableSize>
</psk:NorthAmericaLegal>
<psk:JISB5 psf2:psftype="Option" psf2:default="false">
  <psk:MediaSizeWidth xsi:type="xsd:integer" psf2:psftype="ScoredProperty">182000</psk:MediaSizeWidth>
  <psk:MediaSizeHeight xsi:type="xsd:integer" psf2:psftype="ScoredProperty">257000</psk:MediaSizeHeight>
  <psk12:PortraitImageableSize xsi:type="psf2:ImageableAreaType" psf2:psftype="Property">3400,5000,175200,247000</psk12:PortraitImageableSize>
  <psk12:BorderlessImageableSize xsi:type="psf2:ImageableAreaType" psf2:psftype="Property">0,0,182000,257000</psk12:BorderlessImageableSize>
</psk:JISB5>
</psk:PageMediaSize>

<!-- orientation-requested-default -->
<psk:PageOrientation psf2:psftype="Feature">
  <psk:Portrait psf2:psftype="Option" psf2:default="true"/>
  <psk:Landscape psf2:psftype="Option" psf2:default="false"/>
  <psk:ReverseLandscape psf2:psftype="Option" psf2:default="false"/>
</psk:PageOrientation>
```

TO FIG. 6B-4

FIG. 6B-4    FROM FIG. 6B-3

```
<!-- finishings-default, finishings-supported -->
<psk:JobStapleAllDocuments psf2:psftype="Feature">
  <psk:None psf2:psftype="Option" psf2:default="true"/>
  <psk:StapleTopLeft psf2:psftype="Option" psf2:default="false"/>
  <psk:StapleTopRight psf2:psftype="Option" psf2:default="false"/>
  <psk:StapleBottomLeft psf2:psftype="Option" psf2:default="false"/>
  <psk:StapleBottomRight psf2:psftype="Option" psf2:default="false"/>
  <psk:StapleDualLeft psf2:psftype="Option" psf2:default="false"/>
  <psk:StapleDualTop psf2:psftype="Option" psf2:default="false"/>
  <psk:StapleDualRight psf2:psftype="Option" psf2:default="false"/>
  <psk:StapleDualBottom psf2:psftype="Option" psf2:default="false"/>
  <psk:SaddleStitch psf2:psftype="Option" psf2:default="false"/>
</psk:JobStapleAllDocuments>

<!-- sides-default, sides-supported -->
<psk:JobDuplexAllDocumentsContiguously psf2:psftype="Feature">
  <psk:OneSided psf2:psftype="Option" psf2:default="true"/>
  <psk:TwoSidedShortEdge psf2:psftype="Option" psf2:default="false"/>
  <psk:TwoSidedLongEdge psf2:psftype="Option" psf2:default="false"/>
</psk:JobDuplexAllDocumentsContiguously>

<!-- print-color-mode-default, print-color-mode-supported, pwg-raster-document-type-supported -->
<psk:PageOutputColor psf2:psftype="Feature">
  <psk:Color psf2:psftype="Option" psf2:default="true"/>
  <psk:Grayscale psf2:psftype="Option" psf2:default="false"/>
  <psk:Monochrome psf2:psftype="Option" psf2:default="false"/>
</psk:PageOutputColor>
</PrintDeviceCapabilities>
```

FIG. 7

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"                            701
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"        702
MsStoreType = 2
PrinterHardwareId = "PrinterApp_device001"
```

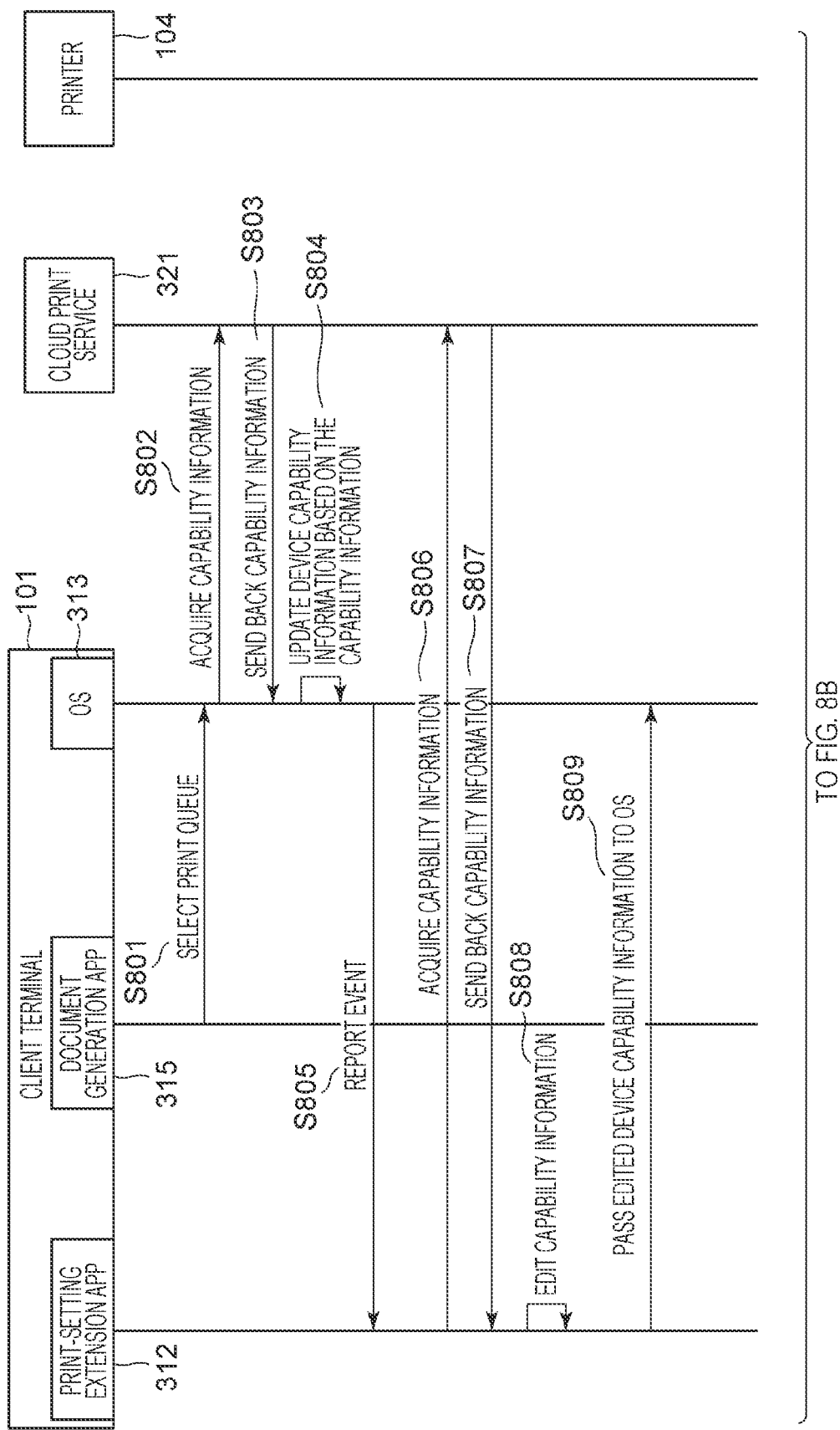

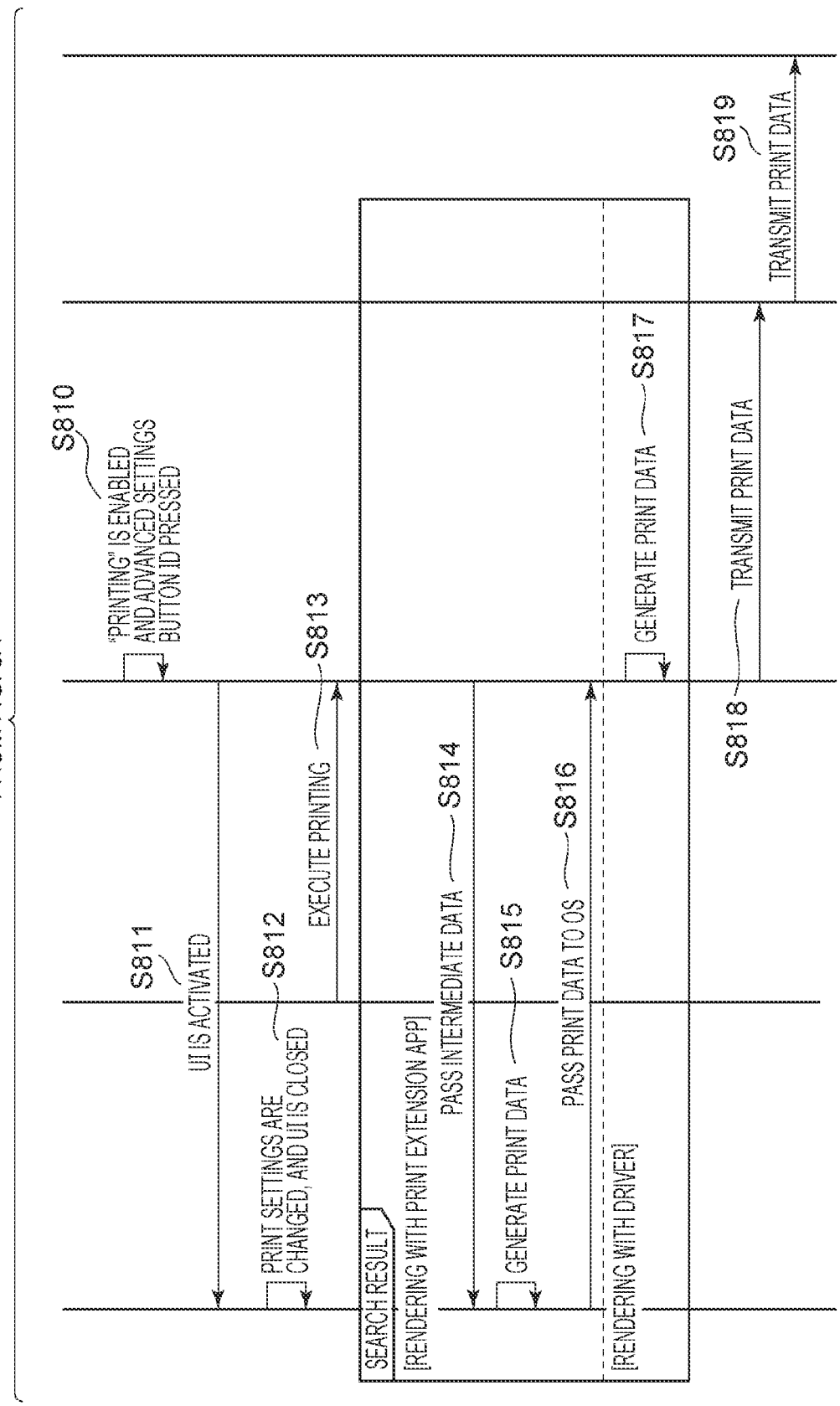

FIG. 16A

OUTPUT PAPER SIZE
A4 ▶
PAPER TYPE
PLAIN PAPER
COPIES
1
ORIENTATION
● PORTRAIT
○ LANDSCAPE
PRINT QUALITY
STANDARD ▶

1001

OK    CANCEL

PRINT BY SECTION
OFF ▶
COLOR MODE
COLOR ▶
MARGINLESS PRINTING
OFF ▶
PAGE COLLATE
2in1 ▶
LAYOUT
FROM LEFT TO RIGHT ▶

OK    CANCEL

FIG. 16C

SCALING
NONE ▶
2-SIDED PRINTING
1-SIDED ▶
BINDING DIRECTION
LONG-EDGE BINDING ▶
ROTATE 180°
NONE ▶

OK    CANCEL

FIG. 18A

|  | INK-JET PRINTER | ELECTROPHOTOGRAPHIC PRINTER |
|---|---|---|
| PAPER SIZE | ○ | ○ |
| PAPER TYPE | ○ | ○ |
| NUMBER OF COPIES | ○ | ○ |
| ORIENTATION | ○ | ○ |
| PRINT QUALITY | ○ | ○ |
| PRINT BY SECTION | ○ | ○ |
| COLOR MODE | ○ | ○ |
| PRINT FROM LAST PAGE | ○ | ○ |
| LAYOUT | ○ | ○ |
| SCALING | ○ | ○ |
| 2-SIDED PRINTING | ○ | ○ |
| BINDING DIRECTION | ○ | ○ |
| ROTATE 180° | ○ | ○ |
| MARGINLESS PRINTING | ○ | — |
| STAPLING | — | ○ |
| FOLDING | — | ○ |
| PAGE COLLATE | — | ○ |
| STORE JOB IN PRINTER | — | ○ |
| ABBREVIATE JOB NAME | — | ○ |

FIG. 18B

|  | INK-JET PRINTER | ELECTROPHOTOGRAPHIC PRINTER |
|---|---|---|
| STATUS | ○ | ○ |
| REMAINING RECORDING AGENT | ○ | — |
| CONSUMABLES PURCHASE SITE URL | ○ | — |

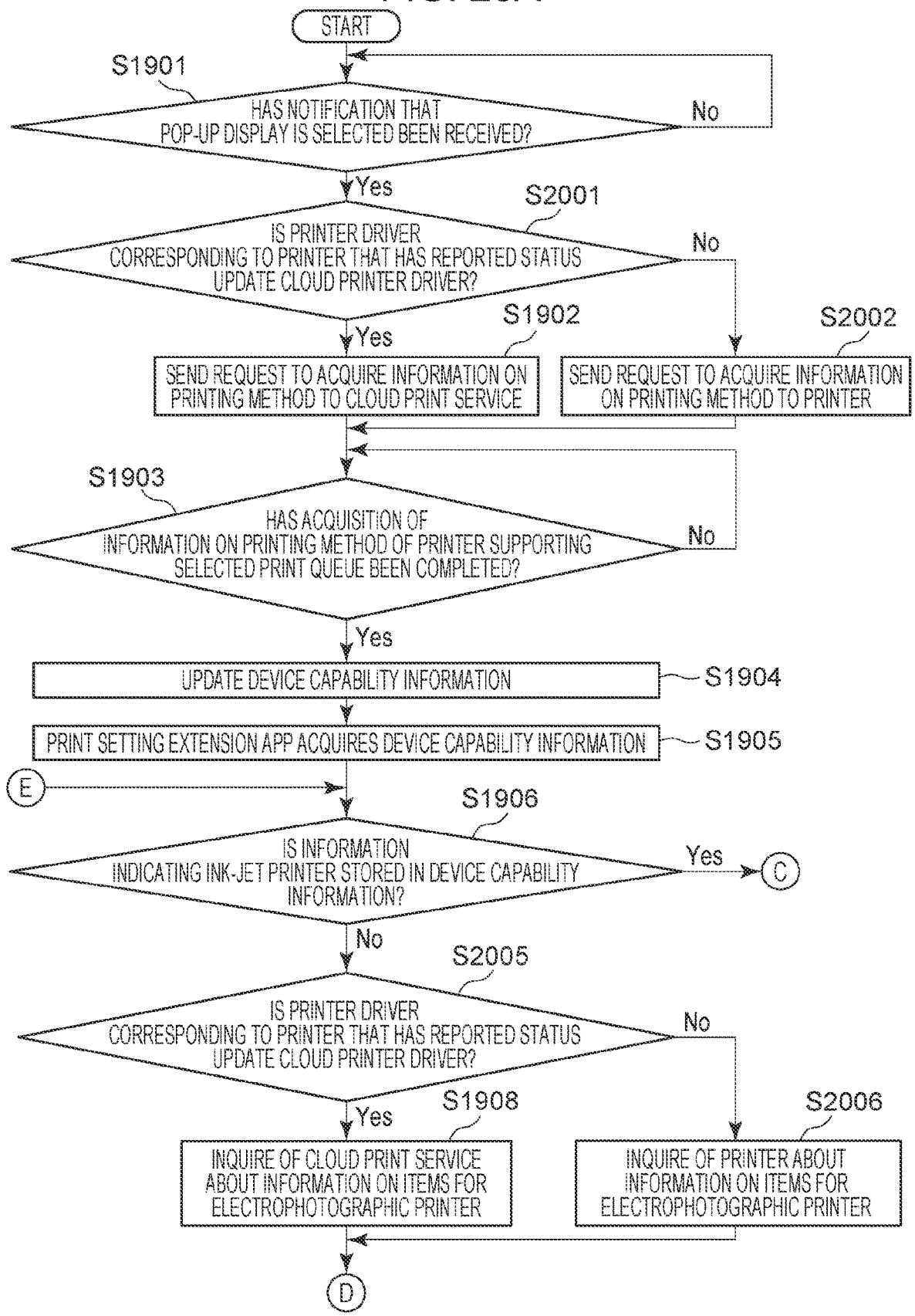

INFORMATION PROCESSING APPARATUS, METHOD FOR CONTROLLING INFORMATION PROCESSING APPARATUS, AND NONVOLATILE STORAGE MEDIUM

BACKGROUND OF THE INVENTION

Field of the Invention

The present invention relates to an information processing apparatus, a method for controlling the information processing apparatus, and a nonvolatile storage medium in which an application to be installed in the information processing apparatus is stored.

Description of the Related Art

Recent general-purpose printer drivers (local printer drivers) communicate with printers using an industry-standard protocol, such as an Internet printing protocol (IPP). General-purpose printer drivers (cloud printer drivers) that communicate with a cloud print service have also been proposed.

General-purpose printer drivers are capable of communicating with printers of a plurality of printer vendors, and users can execute printing by transmitting print data to printers or a cloud print service without installing vendor-specific printer drivers.

The general-purpose printer drivers (local printer drivers and cloud printer drivers) deal with the print jobs of printers of various vendors and therefore have limitations in available print setting items and functions. To cope with this issue, Japanese Patent Laid-Open No. 2021-124791 proposes associating a general-purpose printer driver with a print setting extension app to display a print setting screen for setting items that cannot be set only with the general-purpose printer driver. The print setting extension app acquires printer information from a server or a printer and displays a print setting screen based on the acquired information.

The general-purpose printer driver can support both ink-jet printers and electrophotographic printers. The print setting extension app may also support various types of printers including ink-jet printers and electrophotographic printers.

The print setting screen that the print setting extension app displays changes between a case where the general-purpose printer driver is associated with an ink-jet printer and a case where it is associated with an electrophotographic printer. For example, in the case where the general-purpose printer driver is associated with an electrophotographic printer, the print setting extension app displays objects for finishing settings, such as stapling and punching, on the print setting screen in accordance with the hardware configuration of the printer. In contrast, in the case where the general-purpose printer driver is associated with an ink-jet printer, the display of the above items is not needed.

Thus, the printer information displayed by the print setting extension app changes according to the type of the printer associated with the general-purpose printer driver.

SUMMARY OF THE INVENTION

An application according to an aspect of the present invention is a print setting application to be installed in an information processing apparatus, the application when executed on the information processing apparatus causes the information processing apparatus to: acquire a printing method of a printer; acquire, in a case where the acquired printing method is a first method, printer information regarding a predetermined item; and display an object based on the acquired printer information on a display, wherein, in a case where the acquired printing method is a second method, the information processing apparatus does not acquire the printer information regarding the predetermined item.

Further features of the present invention will become apparent from the following description of embodiments with reference to the attached drawings.

BRIEF DESCRIPTION OF THE DRAWINGS

FIGS. 3A and 3B are sequence charts showing a process for installing a print setting extension app in an embodiment.

FIG. 5A is a diagram illustrating an example of capability information stored in an ink-jet printer in an embodiment.

FIG. 5B is a diagram illustrating an example of capability information stored in an electrophotographic printer in an embodiment.

FIGS. 6A-1 and 6A-2 are diagrams illustrating an example of device capability information in an initial state included in an OS in an embodiment.

FIGS. 6B-1 to 6B-4 are diagrams illustrating an example of device capability information extended using information acquired from a cloud print service in an embodiment.

FIG. 7 is a diagram illustrating an example of an extension setup information file acquired from an online support service in an embodiment.

FIGS. 8A and 8B illustrate a sequence chart of the print setting extension app showing an example of a process from print setting to transmission of print data in an embodiment.

FIGS. 16A to 16C are diagrams illustrating examples of a print setting screen displayed in the case where the print setting extension app is installed and a print queue corresponding to an ink-jet printer is selected in an embodiment.

FIGS. 18A and 18B are examples of a table stored in the print setting extension app in an embodiment.

FIGS. 20A and 20B illustrate a flowchart of a process for the print setting extension app to display a status screen in the second embodiment.

DESCRIPTION OF THE EMBODIMENTS

Embodiments of the present invention will be described hereinbelow with reference to the drawings. Each of the embodiments of the present invention described below can be implemented solely or as a combination of a plurality of the embodiments or features thereof where necessary or where the combination of elements or features from individual embodiments in a single embodiment is beneficial.

First Embodiment

Figure 1:
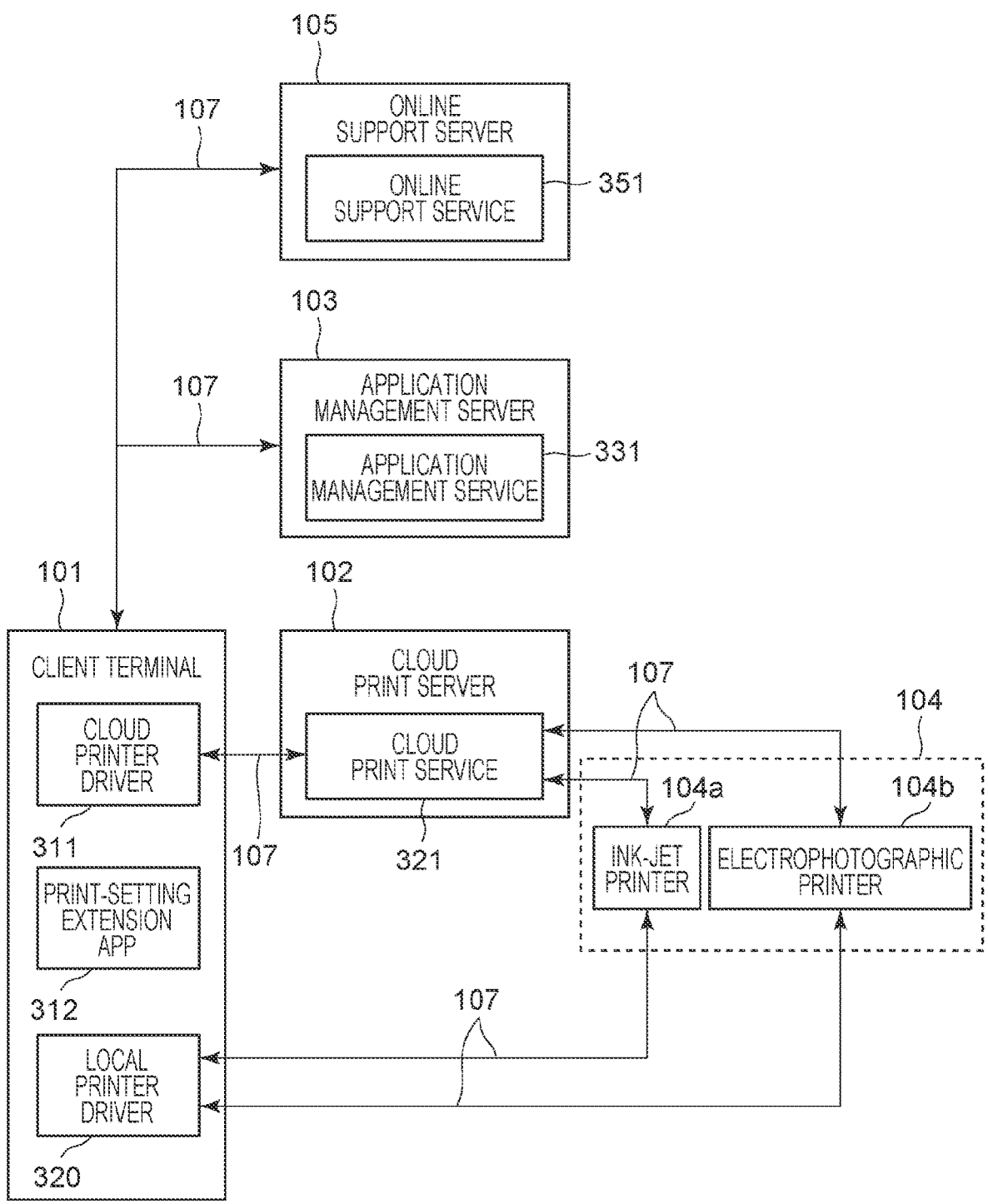
FIG. 1 is a diagram of a printing system in cloud printing in an embodiment.

FIG. 1 is a configuration diagram of a printing system in cloud printing according to an embodiment. A client terminal 101, a cloud print server 102, an application management server 103, a printer 104 (an ink-jet printer 104a and an electrophotographic printer 104b), and an online support server 105 are connected together via a network 107. In this embodiment, the ink-jet printer 104a, the electrophotographic printer 104b, if not distinguished, are referred to as "printer 104".

FIG. 1 illustrates one client terminal 101 and one printer 104. Alternatively, multiple client terminals 101 and printers 104 may be provided.

The server system of the cloud print server 102, the application management server 103, and the online support server 105 may be each constituted by a plurality of information processing apparatuses. The server system constituted by a plurality of information processing apparatuses allows a load to be distributed to the plurality of information processing apparatuses.

Alternatively, the cloud print server 102, the application management server 103, and the online support server 105 may virtually be physically formed in one information processing apparatus.

The client terminal 101 is an information processing apparatus, such as a computer, a tablet terminal, or a smartphone. The client terminal 101 has a local printer driver 320 and a cloud printer driver 311 installed in advance. The local printer driver 320 is a general-purpose printer driver capable of generating print data to be printed by the printer 104 and generating print data that can be printed by a plurality of types of printers of a plurality of vendors. The cloud printer driver 311 is a printer driver capable of generating print data to be transmitted to the printer 104 via a cloud print service 321. The cloud printer driver 311 is also a general-purpose printer driver capable of generating print data that can be printed by a plurality of types of a plurality of vendors. A print setting extension app 312 is a print setting application (program) for extending the print settings of the local printer driver 320 and the cloud printer driver 311. The print setting extension app 312 is downloaded and installed in the client terminal 101 using a method described below.

The network 107 is assumed to be a wide area network (WAN), such as the Internet, for connection to the cloud service but may be in a closed environment, such as a company local area network (LAN).

The client terminal 101 is an information processing apparatus, such as a personal computer (PC), a tablet, or a smartphone, which is directly operated by a user. Any application software can be executed on the client terminal 101.

The printer 104 is a device that actually prints on a printing medium, such as paper, which is an image forming apparatus that converts print data received via the network 107 to image data and prints it.

The printer 104 is capable of both receiving print data from the client terminal 101 via the cloud print server 102 or directly receiving print data from the client terminal 101 not via the cloud print server 102.

The printer 104 receives print data generated by the cloud printer driver 311 of the client terminal 101 via the cloud print server 102. The printer 104 also receives print data generated by the local printer driver 320 of the client terminal 101 not via the cloud print server 102.

The cloud print server 102 receives a print instruction and print data from the outside. The cloud print server 102 transmits the received print data to the printer 104 designated by the print instruction.

The application management server 103 holds and manages various applications.

The application management server 103 receives an application identification information and a download request from the client terminal 101 and transmits an application specified on the basis of the received identification information to the client terminal 101.

The online support server 105 is a server apparatus that provides an online support service 351. The online support service 351 is a server apparatus for providing an extension setup information file in which information for extending the functions of the client terminal 101 is described to the client terminal 101.

Next, referring to FIGS. 2A to 2F, the hardware configuration of the system of this embodiment will be described.

Figure 2A:
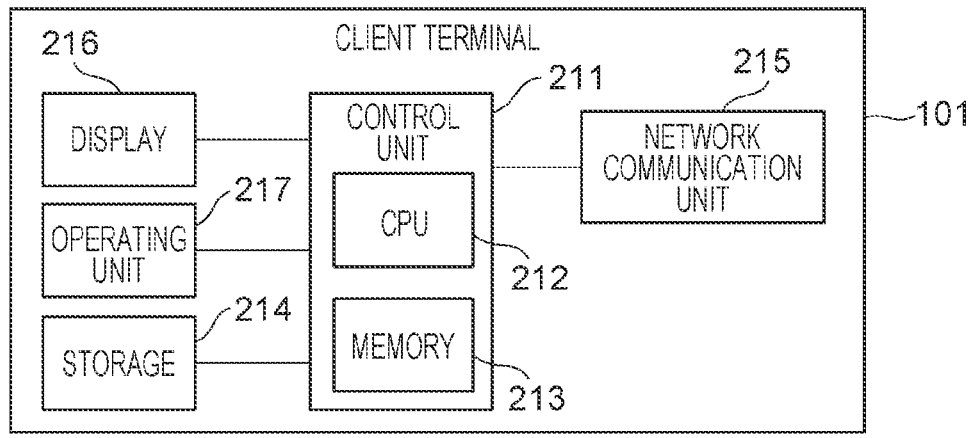
FIGS. 2A to 2F are block diagrams illustrating the hardware configuration of an information processing apparatus and an image forming apparatus in an embodiment.

FIG. 2A is a block diagram illustrating the hardware configuration of the client terminal 101.

The client terminal 101 includes a display 216, an operating unit 217, a storage 214, a control unit 211, and a network communication unit 215.

The storage 214 is a nonvolatile storage apparatus, such as a hard disk or a solid-state drive (SSD), which is capable of storing and rewriting digital data.

The control unit 211 includes a central processing unit (CPU) 212 and a memory 213 and controls the overall operation of the client terminal 101. The CPU 212 applies programs stored in the storage 214 to the memory 213 for execution. The memory 213 is the main memory of the CPU 212 and is used as a work area and a temporary storage area for applying various programs.

The network communication unit 215 is an apparatus for communicating with the external network 107 and inputs and outputs digital data to and from the external servers and client terminals via the network 107.

The display 216 is an apparatus, such as a liquid crystal display (LED), for displaying visual information to the user. The operating unit 217 is an apparatus for accepting input from the user with a keyboard or a mouse. Another example is an apparatus, such as a touch panel, having both of the functions of the display 216 and the operating unit 217.

Figure 2B:
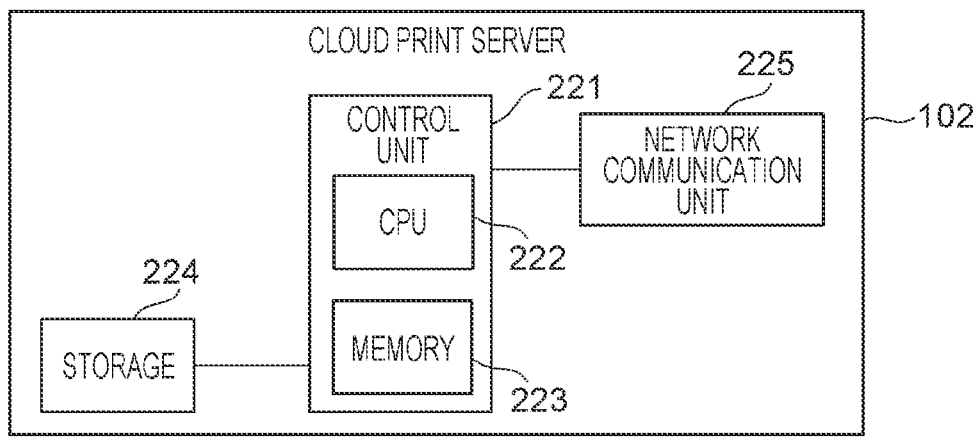

FIG. 2B is a block diagram illustrating the hardware configuration of the cloud print server 102. The cloud print server 102 includes a storage 224, a control unit 221, and a network communication unit 225.

Since the storage 224, the control unit 221, and the network communication unit 225 are the same as those of the client terminal 101, descriptions thereof will be omitted.

The cloud print server 102 is constituted by one information processing apparatus with the hardware configuration shown in FIG. 2B but, alternatively, may be constituted by a plurality of information processing apparatuses shown in FIG. 2B.

Figure 2C:
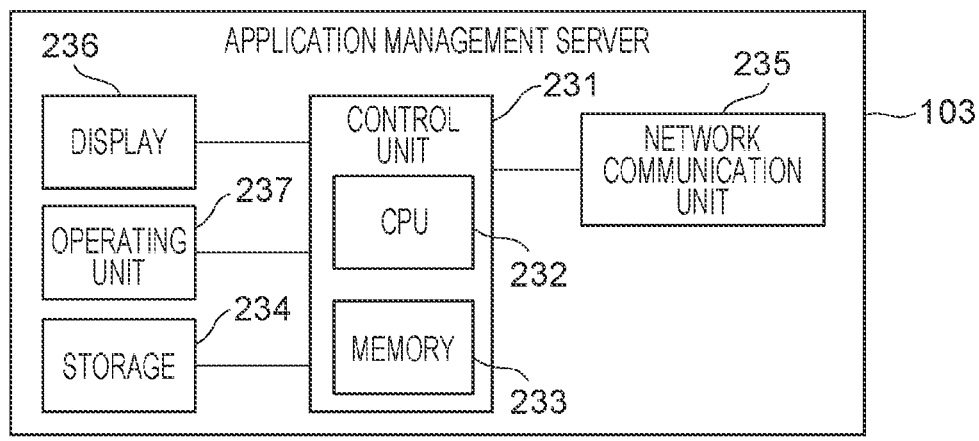

FIG. 2C is a block diagram illustrating the hardware configuration of the application management server 103. The application management server 103 includes a display 236, an operating unit 237, a storage 234, a control unit 231, and a network communication unit 235.

Since the display 236, the operating unit 237, the storage 234, the control unit 231, and the network communication unit 235 are the same as those of the client terminal 101, descriptions thereof will be omitted.

The application management server 103 is constituted by one information processing apparatus with the hardware configuration shown in FIG. 2C but, alternatively, may be constituted of a plurality of information processing apparatuses.

Figure 2D:
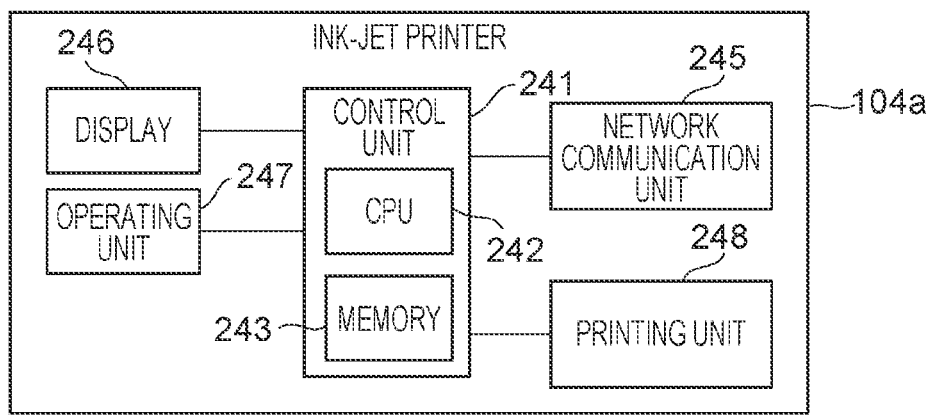

FIG. 2D is a block diagram illustrating the hardware configuration of the ink-jet printer 104a. The ink-jet printer 104a includes a display 246, an operating unit 247, a control unit 241, a network communication unit 245, and a printing unit 248.

The display 246 is an apparatus for displaying information to the user, such as a touch panel or an LED, provided at the ink-jet printer 104a.

The operating unit 247 is an apparatus for accepting input from the user and may include a hardkey, such as a numerical keypad, in addition to a touch panel. Since the control unit 241 is the same as that of the client terminal 101, a description thereof will be omitted.

The network communication unit 245 is an apparatus for communicating with the external network 107 and has the function of mainly receiving print data and transmitting information on the ink-jet printer 104a, such as an error, to the external server and the like.

The printing unit 248 is an apparatus that performs a printing process by executing a sequence of actions, feeding, printing, and ejection of paper in a cassette or tray. Examples of the printing method include, but are not limited to, an electrophotographic method and an ink-jet method. The printing unit 248 includes a double-sided unit and finishing apparatuses for stapling and punching, for example.

Figure 2E:
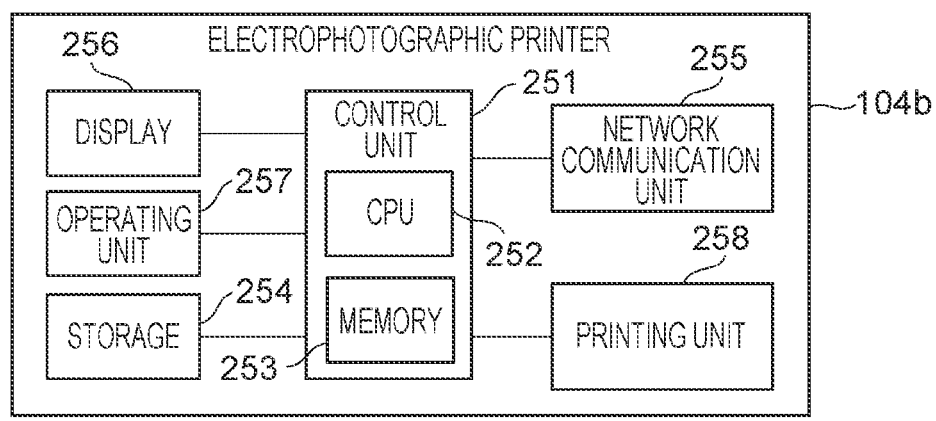

FIG. 2E is a block diagram illustrating the hardware configuration of the electrophotographic printer 104b. The electrophotographic printer 104b includes a display 256, an operating unit 257, a storage 254, a control unit 251, a network communication unit 255, and a printing unit 258. Since the display 256, the operating unit 257, the control unit 251, the network communication unit 255, and the printing unit 258 are the same as those of the ink-jet printer 104a, descriptions thereof will be omitted. The storage 254 is also the same as that of the client terminal 101, and a description thereof will be omitted.

Figure 2F:
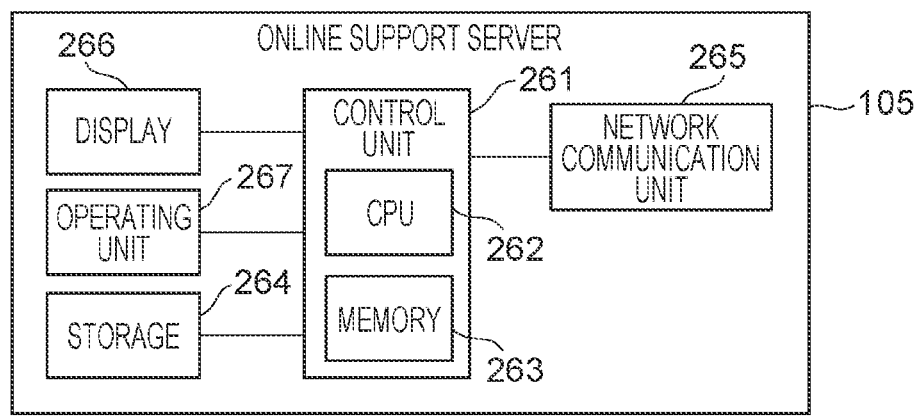

FIG. 2F is a hardware block diagram illustrating the details of the online support server 105. In this embodiment, the online support server 105 is constituted of one information processing apparatus but, alternatively, may be constituted by a plurality of information processing apparatuses.

The online support server includes a display 266, an operating unit 267, a storage 264, a control unit 261, and a network communication unit 265. Since the display 266 and the operating unit 267 are the same as the display 216 and the operating unit 217 of the client terminal 101, descriptions thereof will be omitted. The storage 264 is a memory device, such as a hard disk drive (HDD) or an SSD. The storage 264 stores an extension setup information file in which information for extending the functions provided by the client terminal 101 is described.

The control unit 261 includes a CPU 262 and a memory 263. The CPU 262 controls the entire online support server 105. The memory 263 is used for a process executed by the CPU 262. The network communication unit 265 is an interface for the online support server 105 to communicate with the client terminal 101. The online support server 105 receives a request to acquire a file stored in the storage 264 via the network communication unit 265 and transmits a corresponding file to the client terminal 101.

Next, referring to FIGS. 3A and 3B, an example of the user's procedure and the sequence between each software and the print service in this embodiment will be described.

First, the printer 104 accepts a printer registering operation for registering the printer 104 with the cloud print service 321 from the user. Next, the printer 104 transmits device identification information on the printer 104 and a printer registration request to the cloud print service 321 (S3001). An example of the device identification information transmitted to the cloud print service 321 is a hardware ID (HWID) assigned to each printer model. The device identification information may be any information that identifies the printer model. One example is a compatible ID (COID) indicating the type of the printer.

In response to receiving the registration request, the cloud print service 321 transmits the uniform resource location (URL) of the cloud print service 321 for printer registration to the printer 104. When the user accesses the URL from the printer 104 or the information processing apparatus, the display of the terminal that has accessed the URL displays a screen containing an entry form for a user ID and a password.

The user enters a user ID and a password for using the cloud print service 321 to log in the cloud print service 321. When the login of the user has succeeded, the cloud print service 321 transmits a request to acquire information necessary for printer registration to the printer 104. In response to the request, the printer 104 transmits printer information to the cloud print service 321.

In response to the printer registration request, the cloud print service 321 registers the information on the printer 104 and generates a print queue for the printer 104. At that time, the cloud print service 321 acquires capability information on the printer 104 and associates the information with the generated print queue. The capability information is information indicating the functions of the printer and necessary for the user to set as print settings in printing, such as double-sided capability information, color capability information, and staple capability information. The capability information includes information indicating whether the printer 104 is an ink-jet printer or an electrophotographic printer.

In this embodiment, the cloud print service 321 acquires the capability information from the ink-jet printer 104a using an IPP as a communication protocol for transmission. FIG. 5A is a diagram illustrating an example of the capability information acquired from the ink-jet printer 104a.

FIG. 5B is a diagram illustrating an example of the capability information acquired from the electrophotographic printer 104b.

The cloud print service 321 acquires the item names, attributes, and default values of the setting items that the printer 104 supports using the IPP. In FIGS. 5A and 5B, descriptions of the default values are omitted, and the head attribute values of the individual items are taken as the default values. The item names correspond to the setting items of print settings, and the attribute values correspond the set values, options, and the ranges of the values of the individual setting items. The item names and the attribute values stored in the printer 104 include information defined as industry-standard specifications according to the IPP and information specifically defined by the printer vendor. For example, of the item names described in FIG. 5B, "Abbreviate job name", "Perfect binding", and attribute values accompanying them are item names and attribute values that are specifically defined by the printer vendor. Printer-vendor-specific attribute values may be defined as attribute values corresponding to item names defined as industry-standard specifications. The capability information is independent of whether the items and attribute values are defined according to the IPP.

A comparison between FIG. 5A and FIG. 5B shows that the ink-jet printer 104a and the electrophotographic printer 104b store different items of capability information. For example, FIGS. 5A and 5B show the item "Print quality". This is a setting item regarding the image quality in printing. The ink-jet printer 104a has "Fine" as a "print quality" option. However, the electrophotographic printer 104b does not have the above option. In contrast, the electrophotographic printer 104b has setting items regarding post-processing, such as stapling, punching, and folding. The capability information differs according to the model and the hardware configuration of the printer.

Next, installation of the print setting extension app 312 performed when the user performs a setup operation for printing with the printer 104 on the client terminal 101 will be described.

Figure 4:
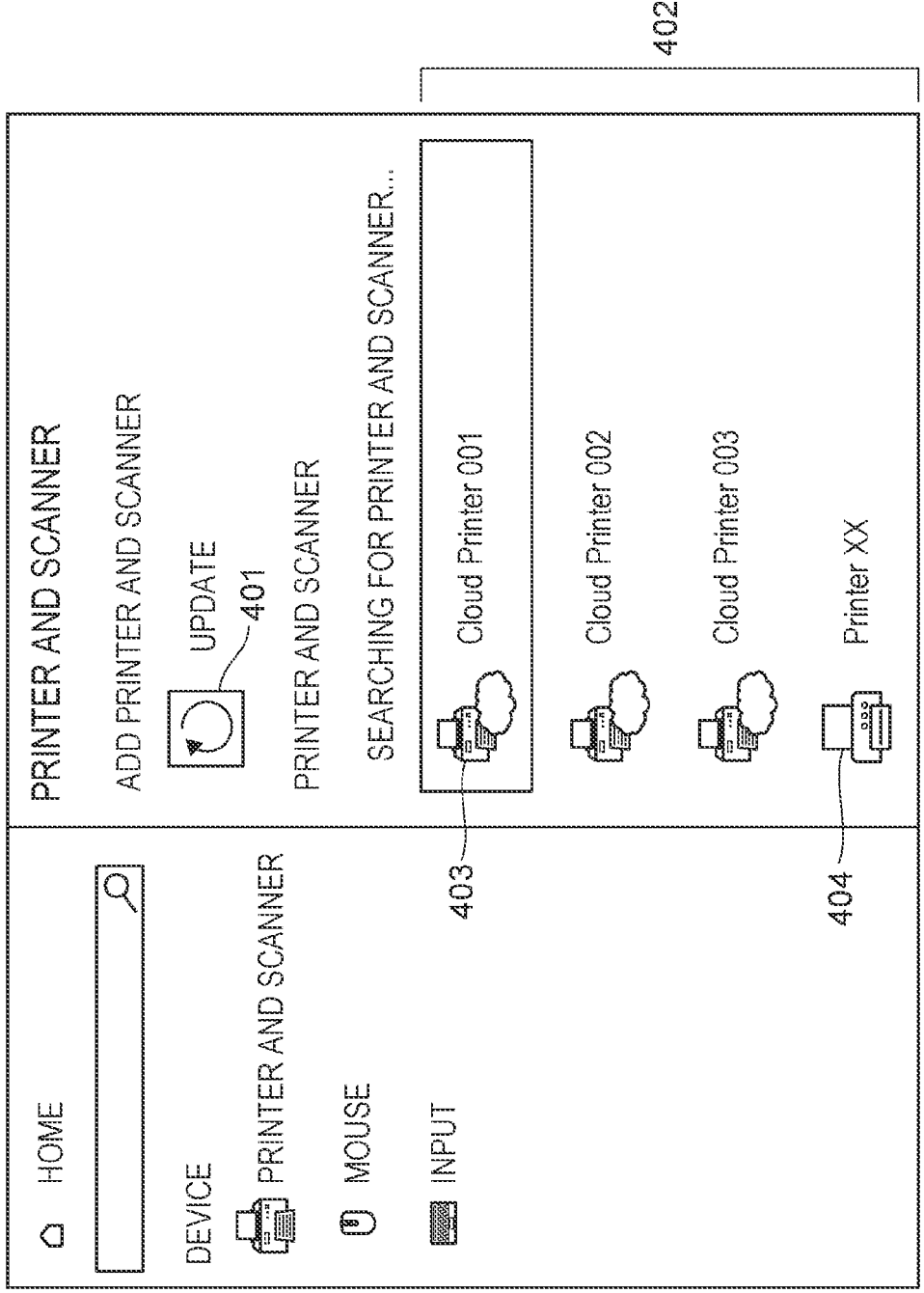
FIG. 4 is a diagram illustrating an example of a screen displayed on a client terminal in an embodiment.

An operating system (OS) 313 of the client terminal 101 accepts a printer adding operation, which is a printer 104 setup operation by the user (S3002). Examples of the printer 104 setup operation are as follows. FIG. 4 is a diagram illustrating a screen related to a printer that the OS 313 of the client terminal 101 displays and that is registered with the client terminal 101. When the user selects an object 401, a printer add instruction is input to the OS 313.

In response to accepting the printer add instruction, the OS 313 accesses the cloud print service 321 to determine whether the OS 313 holds a token for acquiring information. If the OS 313 does not have the token, then the OS 313 displays a screen for inputting user information (login name and a password). The OS 313 transmits user information input via the screen to the cloud print service 321 to request user authentication and an access token (S3003).

The cloud print service 321 performs an authentication process using the user information received from the client terminal 101 (S3004). After the authentication process is completed, the cloud print service 321 notifies the client terminal 101 of the result of the authentication process.

If the user authentication has succeeded, the OS 313 of the client terminal 101 receives an access token from the cloud print service 321 (S3005).

If the user authentication has failed at S3004, the cloud print service 321 notifies the OS 313 of the authentication error (S3006). The OS 313 stops the process in accordance with the authentication error information received (S3007). The OS 313, which has failed in acquiring an access token, terminates the process shown in FIGS. 3A and 3B.

If the OS 313 already has the access token or acquired the token at S3005, the OS 313 goes forward to S3008. The OS 313 searches for a printer registered with the cloud print service 321 and a printer connected to the network 107.

The OS 313 transmits a request to acquire printer information registered with the cloud print service 321 to search for a printer (S3008). At that time, the OS 313 transmits a printer information acquisition request accompanied by the access token to the cloud print service 321.

The cloud print service 321 is authorized for use by the user identified by the access token attached to the acquisition request and transmits the printer name and the HWID of a printer associated with the tenant ID for use in the client terminal 101 (S3009).

The OS 313 displays a printer list in an area 402 of FIG. 4 in accordance with the printer information acquired from the cloud print service 321 and printer information detected in a search via the network 107. The OS 313 may display only the printer information registered with the cloud print service 321. Reference sign 403 denotes a printer detected in the search of the cloud print service 321. Reference sign 404 denotes a printer connected to the same network as the client terminal 101. Displaying the printers with different object signs, like 403 and 404, allows determination of whether each printer is a printer on the same network or a printer registered with the cloud print service 321.

When the user selects printer information from the list in the area 402, the OS 313 inquires of the cloud print service 321 about capability information on a printer corresponding to the selected printer information (S3010). About which setting item the OS 313 inquires for capability information is defined by the specifications of the OS 313. The inquiry about the capability information from the OS 313 is designated from the setting items defined as standard specifications according to the IPP of the OS 313.

The cloud print service 321 sends capability information on the printer 104 to the OS 313 (S3011) in response. The capability information sent from the printer 104 may be not only the capability information registered with the cloud print service 321 at S3001 but also capability information registered with the cloud print service 321 at another timing. For example, the capability information may be sent at the timing when the capability information on the printer 104 is changed or the timing when the OS 313 detects the activation of an advanced print setting screen.

At S3011, the cloud print service 321 gives, for a setting item designated by the client terminal 101, an attribute value and a default value corresponding to the setting item. Here, all the attribute values registered with the cloud print service 321 are given. If the cloud print service 321 does not store a reply to the attribute about which the OS 313 inquired, the cloud print service 321 sends no response to the OS 313.

Next, the OS 313 starts to install the cloud printer driver 311 on the basis of the device identification information and the printer name of the printer selected by the user.

Then, the OS 313 generates the print queue of the cloud printer driver 311 with basic device capability information included in the OS 313 (S3012). The device capability information refers to definition information required to generate print setting capability information of the printer driver, for example, PrintDeviceCapabilites, described in extensible markup language (XML). FIGS. 6A-1 and 6A-2 are diagrams illustrating an example of the device capability information in an initial state included in the OS 313. For example, part 601 is device capability information about paper size. For "PageMediaSize" in which a setting item "Feature" indicates paper size, "Option" includes only two paper sizes, "A4" and "LETTER", as the initial values of the device capability information. This information is stored in association with the print queue and is managed by the OS 313. The initial-state device capability information is fixed regardless of information on the connected printer.

Thereafter, the OS 313 updates the device capability information of the cloud printer driver 311 using capability information acquired from the cloud print service 321. FIGS. 6B-1, 6B-2, 6B-3, and 6B-4 are diagrams illustrating an example of device capability information updated using the capability information acquired from the cloud print service 321. For example, part 602 is the updated device capability information about paper size. For "PageMediaSize" indicating paper size, "A5", "HagakiPostcard", and so on, which are "Option" other than "A4" and "LETTER", are added as paper sizes that the printer 104 can print. Thus, the client terminal 101 first registers the device capability information included in the OS 313 with the print queue in association with the cloud printer driver 311. At that time, the OS 313 extends the setting values by updating the device capability information using, of the capability information acquired from the cloud print service 321, only attribute values defined by industry-standard specifications. Even if a vendor specific attribute value is acquired in acquiring the capability information, the vendor-specific attribute value is not added to the device capability information. Thus, installation of the cloud printer driver 311 is completed.

Next, the OS 313 starts to install an application (program) for extending the cloud printer driver 311 in association with the printer.

First, the OS 313 performs additional-identification-information adding process on the device identification information. This process is required to acquire an extension setup information file 700 for the online support server 105 and may be a character string different from normal device identification information. In this embodiment, additional identification information ("PrinterApp_") indicating that the OS 313 is an application corresponding to the printer is added to the device identification information to distinguish the application from an application of the other device. "PrinterApp_" is illustrative only and may be another character string, numeral, or sign. As a result, if the device identification information on the printer 104 is device001, the device identification information after the additional identification information is added becomes PrinterApp_device001.

The OS 313 transmits a request to search for the extension setup information file 700 containing the target device identification information with additional information to the online support service 351 (S3013). At that time, "PrinterApp_devoce001" with the additional identification information is reported to the online support service 351.

FIG. 7 illustrates an example of the extension setup information file 700, which is stored in the searched online support service 351.

The extension setup information file 700 describes an application identifier for identifying a print setting extension app for use in setting print data to be sent to the printer 104. Of the extension setup information file 700 in FIG. 7, the item "PackageFamilyName" 701 is identification information on the print setting extension application, which, in FIG. 7, corresponds to PrinterApp_aaaaaaaaaaa8a!App. Meanwhile, "PrinterHardwareID" 702 describes a character string in which additional identification information is added to the identification information on the printer 104. In FIG. 7 PrinterApp_device001 is described.

The online support service 351 also stores extension setup information in which printer driver identification information is described. In the extension setup information file in which the identifier of the printer driver, the identifier of the printer driver, "PackageFamilyName" is described. "PrinterHardwareId" in the extension setup information file describes device identification information containing no additional identification information. For this reason, the OS 313 adds additional identification information to the device identification information to acquire a necessary extension setup information file from the online support service 351.

In this embodiment, the extension setup information file 700 is prepared for each HWID of the printer. The extension setup information file corresponding to the printer 104a and the extension setup information file corresponding to the electrophotographic printer 104b contain identification information on the same print setting extension application. This allows one print setting extension application to be associated with both the ink-jet printer 104a and the printer 104b. A plurality of HWIDs may be described in one extension setup information file. For example, the HWIDs of the ink-jet printer 104a and the electrophotographic printer 104b are described in one extension setup information file. This method also allows one print setting extension application to be associated with both the ink-jet printer 104a and the electrophotographic printer 104b.

If the online support service 351 has the extension setup information file 700 containing target device identification information, the online support service 351 sends the extension setup information file 700 to the OS 313 (S3014). The contents of the sent extension setup information file are written to the registry of the OS 313.

Next, the OS 313 installs the extension setup information written in the extension setup information file acquired from the online support service 351 in association with the print queue generated at S3012 (S3015).

Next, the OS 313 extracts the application ID described in "PackageFamilyName" from the installed extension setup information (S3016).

If the online support service 351 cannot detect the extension setup information file 700 containing the target device identification information, the OS 313 stops the installation of the cloud printer driver (S3017). The OS 313 terminates the application installing process. If the OS 313 cannot receive the extension setup file or receives an error notification from the online support service 351 in a predetermined time after the search request, the OS 313 executes the process of S3017.

The following is a process after the search for the extension setup information file has succeeded.

The OS 313 sends a request to search for an application that matches the extracted application ID to an application management service 331 (S3018).

In response to receiving the search request, the application management service 331, if having a print setting extension app that matches the application ID, sends the print setting extension app 312 to the client terminal 101 (S3019).

The OS 313 installs the acquired print setting extension app 312 in association with the print queue generated by the client terminal 101 (S3020). At that time, the OS 313 stores the application ID in the registry as print queue information. The print setting extension app 312 is set to the OS 313 so that the OS 313 gives an event notification to the print setting extension application 312 at a timing set on the print setting screen.

After the OS 313 is activated, the installed print setting extension app 312 is activated and operates as a background task.

If the search result shows that the application management service 331 does not hold the requested print setting extension app that matches the application ID, the OS 313 stops the application installing process (S3021). At that time, the generated print queue is installed in association with the cloud printer driver 311, but the print setting extension app 312 is not associated with the print queue, and the process is terminated.

The extension setup file, if distinguished from the printer driver installing file, may be searched for without adding a predetermined character string.

Next, referring to FIGS. 8A and 8B, an example of the user's procedure and the sequence between each software and the print service in this embodiment will be described.

A document generation app 315 displays a print setting screen (FIG. 11) for selecting a print queue as a print-setting initial screen. Examples of the document generation app 315 include to a document data creation application, a presentation-material creation application, and a picture/image data display application.

In this embodiment, the print-setting initial screen is displayed by the document generation app 315. Alternatively, the OS 313 may display a similar screen. The print-setting initial screen displays an object 1101 for selecting a print queue, which is printer information, an object 1102 for print settings, and a print preview image 1103. The OS 313 selects the print queue selected by the user at the object 1101 (S801). The processes of S801 to S809 are executed at the timing when the display of the print-setting initial screen is started. The OS 313 executes the processes of S801 to S809, with a default printer selected. The processes of S801 to S809 are executed also when the user selects the object 1101 to change the print queue.

Next, the OS 313 inquires of the cloud print service 321 about capability information on the printer 104 corresponding to the selected queue (S802). Since which setting item of the capability information is inquired about depends on the specifications of the OS 313, the capability information acquired at the timing is the same as that acquired at S3010 of FIG. 3A. The inquiry is sent to the printer 104 using a standard protocol defined by the IPP, such as Get-print-Attributes. If Get-print-Attributes is used, capability information determined by the OS 313 is inquired about in a list format.

The cloud print service 321 sends capability information on the printer 104 from the list of capability information sent using Get-print-Attributes to the OS 313 (S803). Assume that the attribute, media size, is specified by Get-print-Attributes (IPP). If the cloud print service 321 holds the attribute of media size, the cloud print service 321 sends back a value (A4, B5, Letter, or the like) associated with the attribute to the OS 313.

If the attribute specified by Get-print-Attributes is not present in the queue of the printer 104 in the cloud print service 321, the cloud print service 321 sends back no associated value.

The OS 313 updates the device capability information using the capability information acquired from the cloud print service 321. The OS 313 adds the capability information acquired at S803 of FIG. 8A to the device capability information generated at S3012 of FIG. 3A (S804). If the device capability information has to be updated, executing the process of S803 allows the device capability information managed by the client terminal 101 to be updated.

Next, the OS 313 notifies the print setting extension app 312 of an event and an application programming interface (API) for use in editing the device capability information (S805). The event is reported from the OS 313 to the print setting extension app 312 at a timing set when the print setting extension app 312 is installed.

In response to receiving the event, the print setting extension app 312 issues a request to acquire capability information to the cloud print service 321. The capability information acquired here is capability information for writing setting items and attribute values that are specifically defined by the printer vendor to the device capability information.

In response to receiving the device capability information editing event from the OS 313, the print setting extension app 312 inquires of the cloud print service 321 about capability information on the printer 104 (S806). At that time, the print setting extension app 312 inquires of the cloud print service 321 about capability information including setting items specific to the printer vendor, such as "Perfect binding" and "Saddle binding", and setting items containing attribute values. Furthermore, the print setting extension app 312 acquires information indicating whether the printer corresponding to the selected printer information is an ink-jet printer or an electrophotographic printer from the cloud print service 321. The inquiry is made using Get-print-Attributes as at S802 of FIG. 8A, in which the item name of the setting item to be inquired is specified to acquire the capability information. The capability information acquired at S806 may be not only the setting items and attribute values specifically defined by the printer vendor but also the setting items in the capability information acquired by OS 313.

In response to receiving an inquiry about specific capability information from the print setting extension app 312, the printer 104 responds to the print setting extension app 312 via the cloud print service 321 (S807). In this embodiment, the capability information sent back at S807 is the capability information on the printer 104 stored in the cloud print service 321. Alternatively, the capability information acquired again from the printer 104 by the cloud print service 321 may be sent back at the timing when the request is given at S806.

In response to acquiring the capability information from the printer 104, the print setting extension app 312 edits the device capability information via a configuration information object which is a data unit required to edit the device capability information. The print setting extension app 312 edits the device capability information by converting the capability information, such as "Perfect binding" and "Saddle binding", acquired at S807 of FIG. 8A to device capability information and adding it to a configuration information object (S808). As a result of the edition, in addition to the capability information on the standard setting items acquired in the inquiry from the OS 313, printer-vendor-specific setting items and attribute values are stored in the device capability information. As a result of the edition, information indicating whether the printer corresponding to the selected print queue is an ink-jet printer or an electrophotographic printer is stored in the device capability information.

Next, the print setting extension app 312 passes the edited device capability information to the OS 313 (S809). The OS 313 stores the device capability information acquired from the print setting extension app 312 in association with the print queue.

Figure 11:
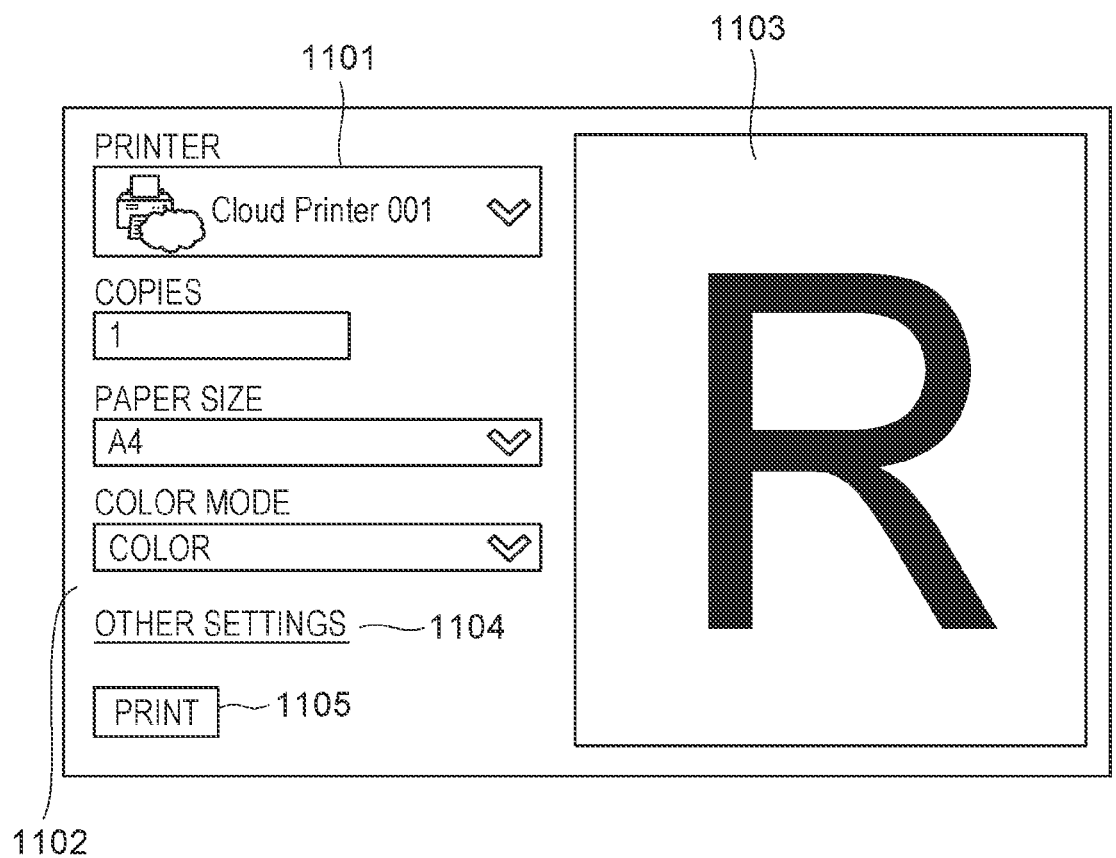
FIG. 11 is a diagram illustrating an example of a print setting screen displayed by a document generation app in an embodiment.

When the OS 313 updates the device capability information, an object serving as a trigger for displaying the user interface (UI) of the print setting extension app 312, like an object 1104 in FIG. 11, is enabled (S810). The object 1104 is in grayout until the process of S810 is completed.

When the user selects the object 1104, the print setting extension app 312 is activated from the OS 313 to display a print setting screen as shown in FIGS. 10A to 10D (S811). The print setting screen does not depend on the kind of the document generation app 315 used.

Figure 9A:
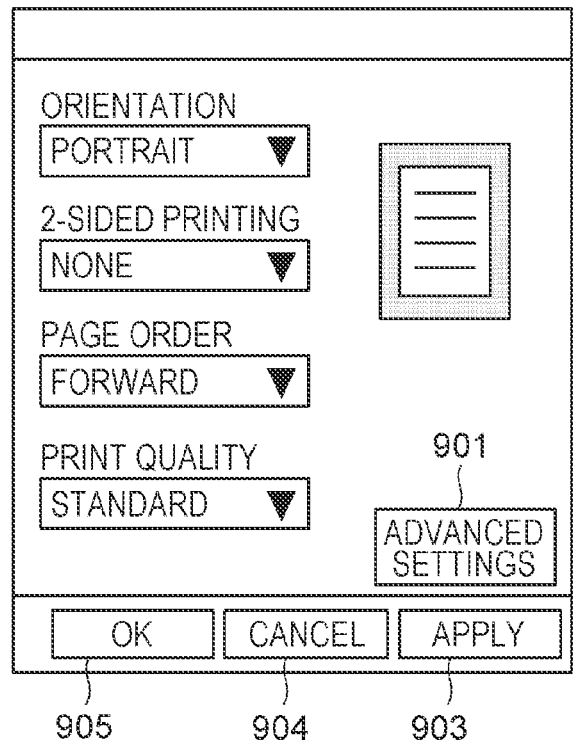
FIGS. 9A to 9D are diagrams illustrating examples of a print setting screen displayed in the case where the print setting extension app is not installed in an embodiment.
Figure 9B:
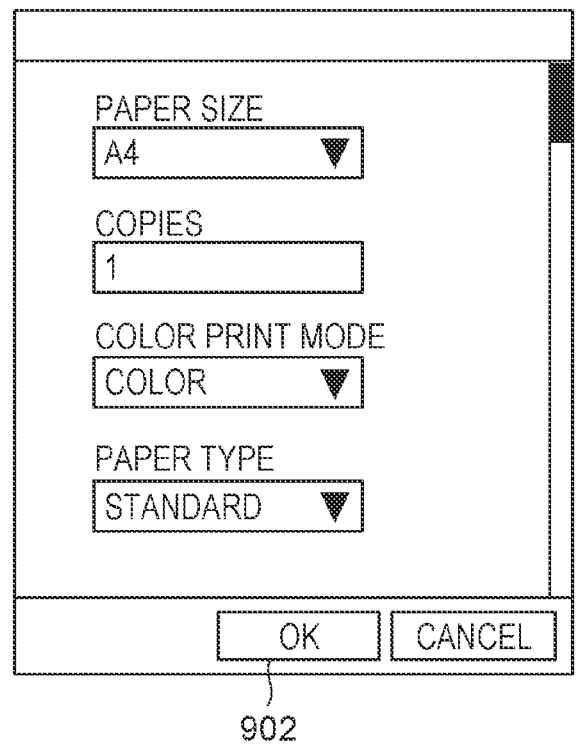
Figure 9C:
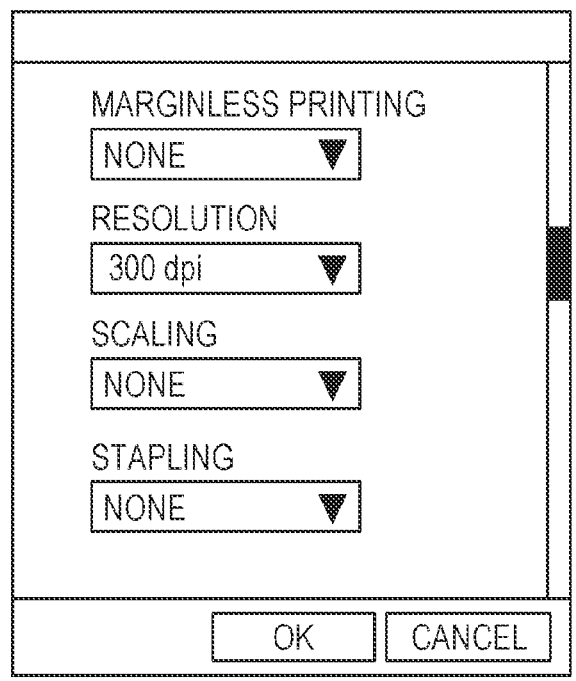
Figure 9D:
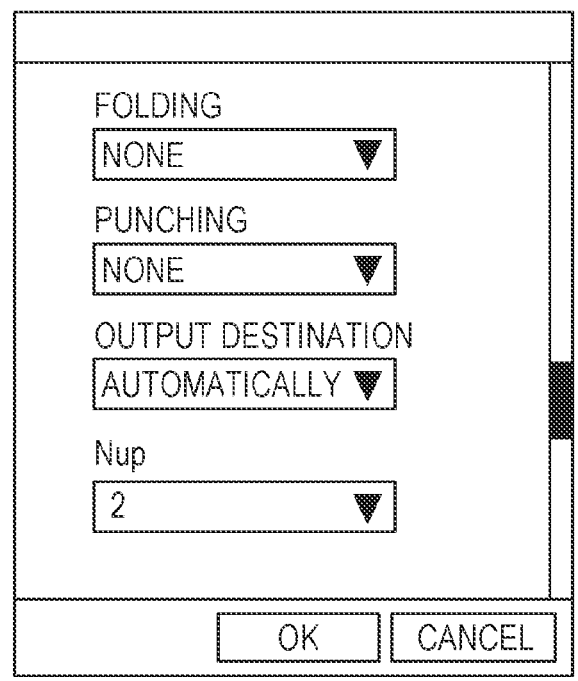

In the case where the print queue and the print setting extension app 312 are not associated with each other, a standard print setting screen installed in advance in the OS 313 is displayed, as in FIG. 9A. When an Advanced Setting button 901 is pressed, the standard print setting screen displays an advanced print setting screen, shown in FIG. 9B, in which setting items that cannot be displayed in FIG. 9A are displayed. The advanced print setting screen shown in FIG. 9B corresponds to the scroll bar, which allows the screen to scroll as in FIGS. 9C and 9D, allowing setting of a plurality of setting items supported by the OS 313. An OK button 902 is used to store the set print settings to return the screen to the screen in FIG. 9A. An Apply button 903 is used to store the print settings. A Cancel button 904 is used to return to the screen in FIG. 11 without storing the print settings. Similarly, an OK button 905 is used to store the print settings and to return to the screen in FIG. 11.

Figure 10A:
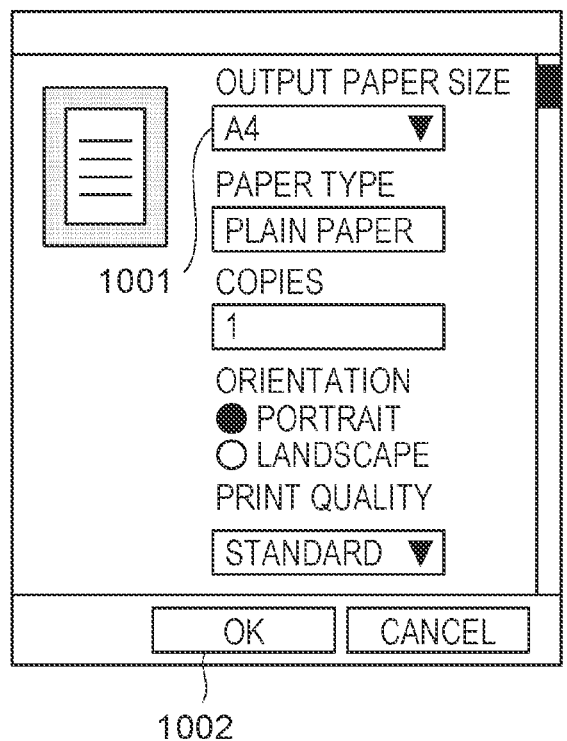
FIGS. 10A to 10D are examples of an extended-printing setting screen displayed in the case where the print setting extension app is installed and a print queue corresponding to an electrophotographic printer is selected in an embodiment.

Referring back to the print setting extension app 312, the print setting extension app 312 receives the print setting information generated from the print setting capability information that the OS 313 generates from the device capability information and displays the extended-printing setting screen in FIG. 10A. This will be described on the assumption that the selected printer is the electrophotographic printer 104b. FIGS. 10A to 10D are examples of the extended-printing setting screen displayed in the case where the printer corresponding to the selected print queue is the electrophotographic printer 104b. FIGS. 10A to 10D are displayed by scrolling the screen.

Figure 10B:
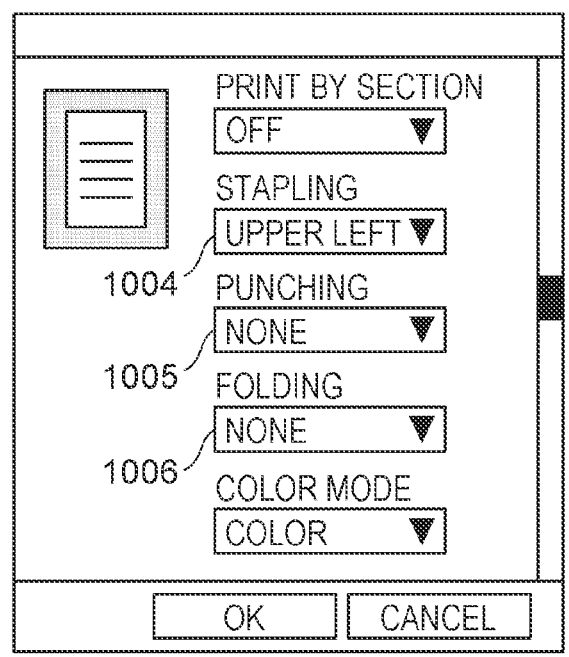
Figure 10C:
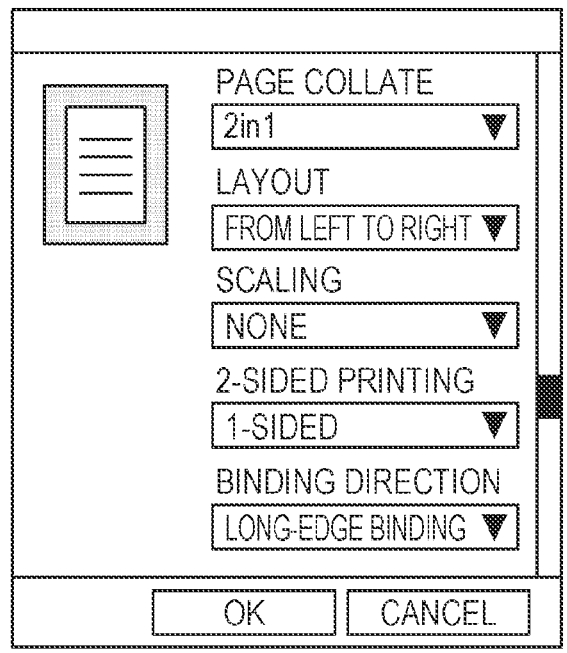
Figure 10D:
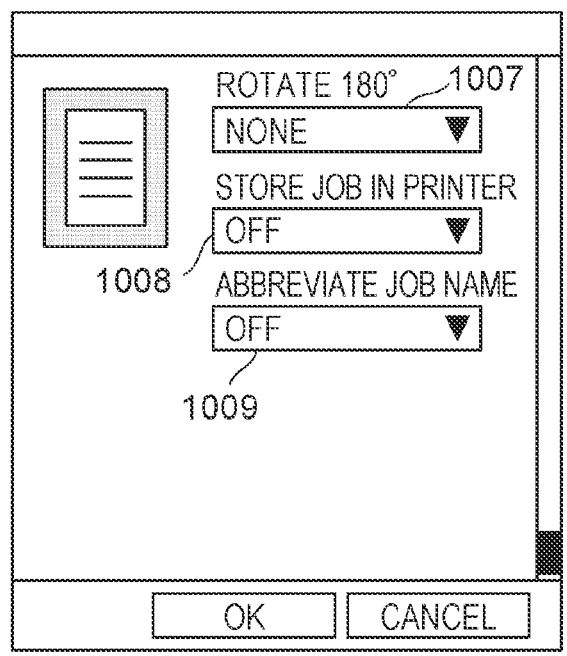

For example, the output paper size of a setting item 1001 in FIG. 10A is print setting information generated from psk:PageMediaSize in FIG. 6B-2. An option A4 of output paper size is generated by the print setting extension app 312 from the information print setting information psk:IOSA4 and displayed. Thus, the print setting extension app 312 displays the device capability information as setting values on the extended-printing setting screen. If the printer corresponding to the selected print queue is the electrophotographic printer 104b, objects for setting Stapling 1004, Punching 1005, and Folding 1006 are displayed, as shown in FIG. 10B. As shown in FIG. 10D, objects for setting items that are not set for an ink-jet printer, for example, Store job to printer 1007 and Abbreviate job name 1009, are also displayed.

If the printer corresponding to the print queue selected at the object 1101 is the ink-jet printer 104a, the extended-printing setting screens shown in FIGS. 16A to 16C.

FIGS. 16A to 16C can be switched by a scrolling operation. Some setting items, such as paper size, paper type, copies, orientation, and print quality, are common to FIGS. 10A to 10D.

In contrast, the extended-printing setting screen in the case where the ink-jet printer 104a is selected does not display setting items specific to electrophotographic printers, such as stapling, punching, and folding. Thus, this embodiment allows switching of the displayed setting items and objects according to the printing method of a printer corresponding to the selected print queue.

FIGS. 10A to 10D and FIGS. 16A to 16C have the following difference, in addition to the difference in setting item.

Figure 13A:
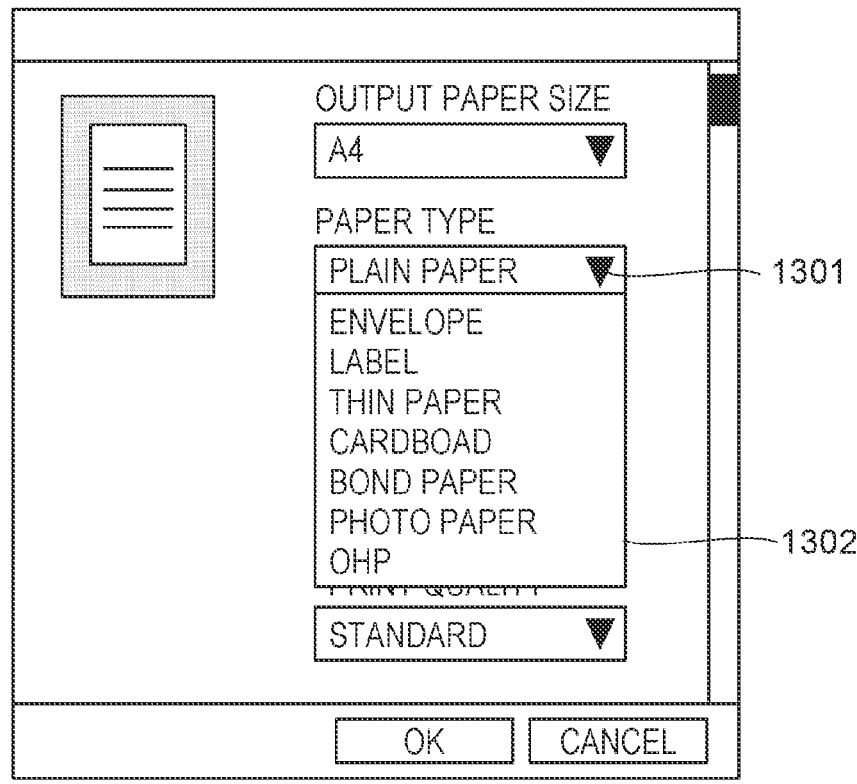
FIGS. 13A and 13B are diagrams illustrating examples of paper types displayed by the print setting extension app in an embodiment.
Figure 13B:
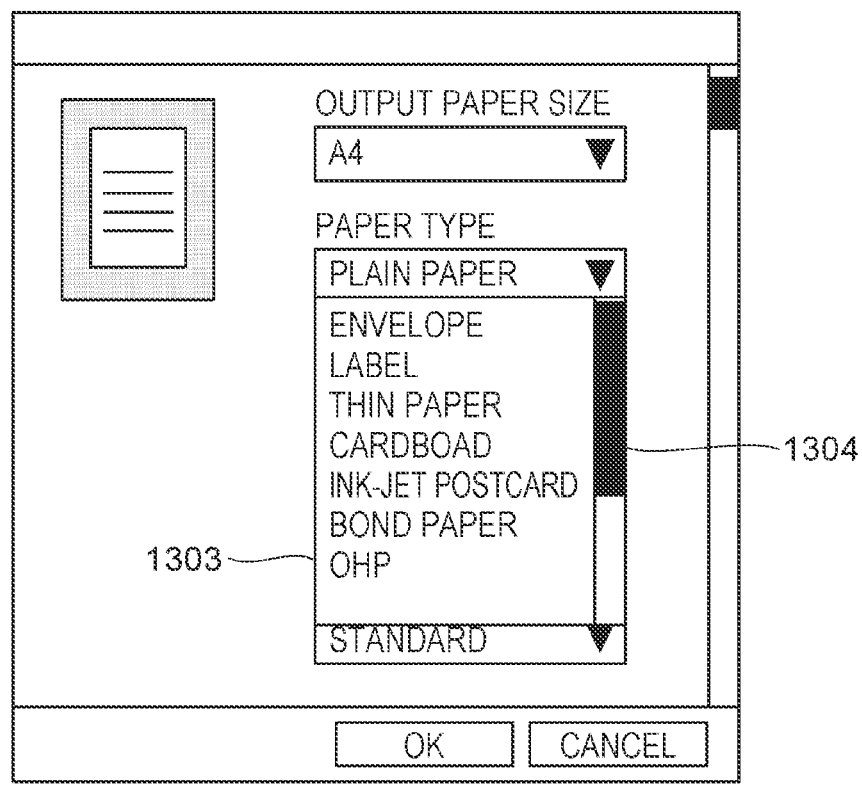

FIGS. 13A and 13B are diagrams illustrating examples of a screen displayed when an object 1301 is selected to expand a pulldown for setting a paper type. FIG. 13A is an example of a screen displayed when the selected printer is the electrophotographic printer 104b. FIG. 13B is an example of a screen displayed when the selected printer is the ink-jet printer 104a.

An area 1302 in FIG. 13A displays attribute values of the paper type shown in FIG. 5B. An area 1303 in FIG. 13B displays attribute values of the paper type shown in FIG. 5A. Since FIG. 13B cannot display all paper types at a time, a slider bar 1304 is displayed so that the user can display paper types not displayed by operating the slider bar. Thus, the print setting extension app 312 allows for displaying different attribute values in accordance with capability information acquired from the printer.

The print setting extension app 312 provides a function for the user to freely change print settings and, if the print settings are changed, stores the setting values thereof. When the user selects the object 1002 displayed on the extended-printing setting screens in FIGS. 10A to 10D and FIGS. 16A to 16C, the print settings are determined. Assuming that the user has changed the media size from A4 to Letter on the UI, the print setting information that the print setting extension app 312 holds changes from A4 to Letter. When the object 1002 is selected by the user, the print setting extension app 312 acquires print setting information that is processed on the print setting screen from the extended-printing setting screen. The print setting extension app 312 passes the print setting information to the OS 313 and closes the extended-printing setting screens shown in FIGS. 10A to 10D and FIGS. 16A to 16C (S812). When the process at S812 is completed, the print setting screen shown in FIG. 11 is displayed in which the setting values set with the print setting extension app 312 are reflected.

When the user selects an object 1105 on the screen shown in FIG. 11, a print instruction is input to the OS 313. The OS 313 executes a printing process in response to the input instruction (S813).

In response to the instruction to execute printing, the OS 313 generates intermediate data and passes the generated intermediate data and the print setting information edited on the print setting screen to the print setting extension app 312 (S814). The intermediate data is data generated before conversion to print data, such as page-description language (PDL) data. One example is extensible markup language (XML) paper specification (XPS) data. The print setting information is also contained in the intermediate data.

In response to receiving the intermediate data and print setting information from the OS 313, the print setting extension app 312 generates print data based on the intermediate data and generates print capability information based on the print setting information (S815). Examples of the print data include a portable document format (PDF) file and a PDL file, such as PWG-Raster. Specifically, the print capability information is an attribute value that is print setting information defined by an IPP.

After generating the print data, the print setting extension app 312 passes the generated print data and the print capability information to the print queue of the OS 313 (S816).

In contrast to S814 to S816, in the case where the print setting extension app 312 is not installed in the client terminal 101, the client terminal 101 executes the process described below at S816. The OS 313 generates XPS data, edits the page layout, and converts the XPS data to a predetermined format to generate print data and print capability information (S817). In this embodiment, the predetermined format is, for example, PDF or PWG-Raster.

The OS 313 transmits the print data and print capability information passed from the print setting extension app 312 or the print data and print capability information generated by the OS 313 to the cloud print service 321 via the print queue (S818).

The cloud print service 321 transmits the print data and print capability information passed from the client terminal 101 to the printer 104 (S819). The printer 104 may regularly send inquiry to the cloud print service 321 to acquire unprinted print data held on the cloud print service 321 and print capability information corresponding to the print data. Although capability information is acquired at the timing when a print queue is selected by the document generation app 315 in the process of S801 in FIG. 8A, and the succeeding processes until the display of the print setting screen are performed, the above process may be started at another timing. For example, the above process may be started at the timing when an Other Settings button 1104 displayed on the document generation app 315 is pressed.

This is a processing procedure for, when a print queue and the print setting extension app 312 are associated with each other, displaying the extended-printing setting screen (FIGS. 10A to 10D) of the print setting extension app 312 at the timing when a print queue is selected and executing printing.

Figure 14:
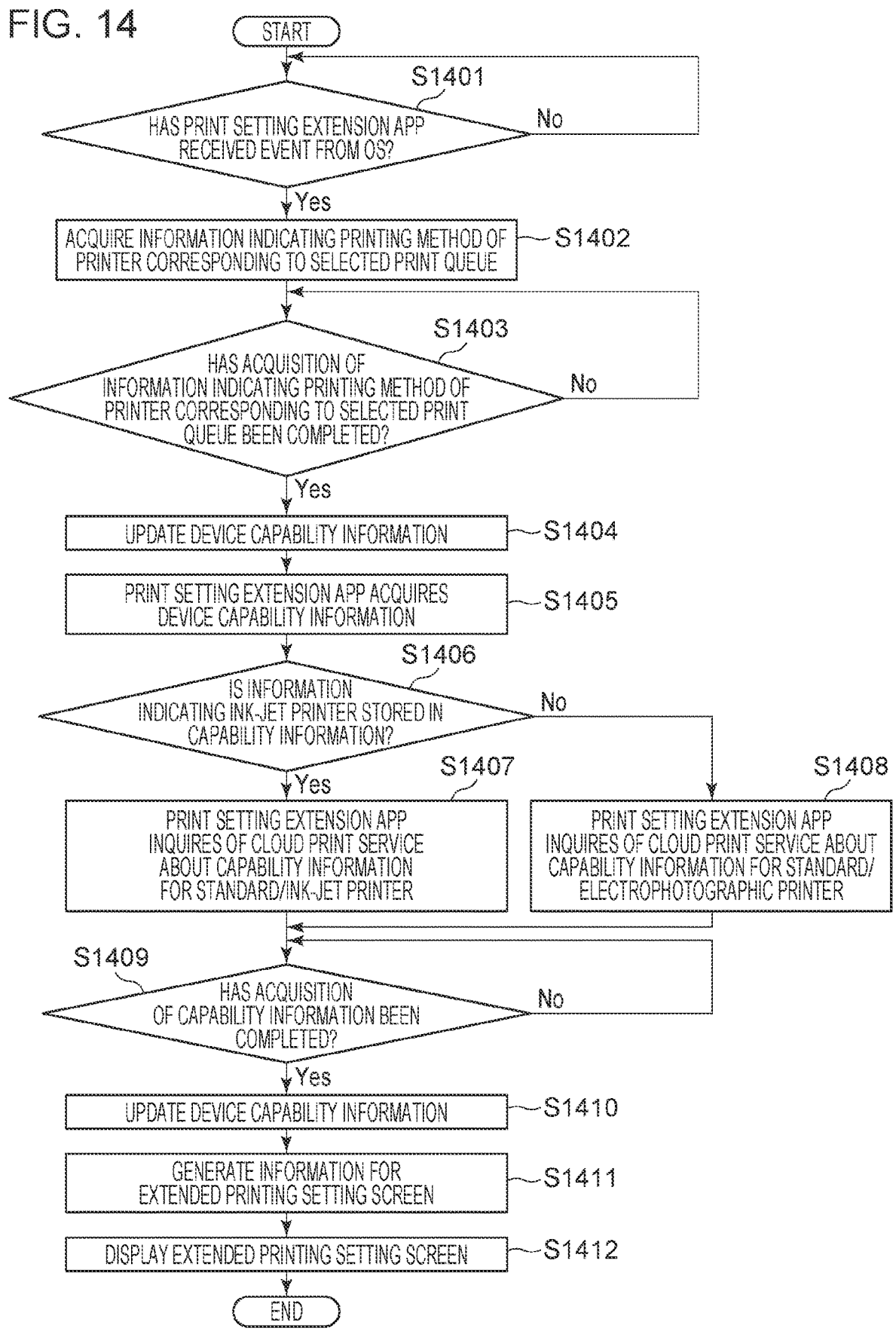
FIG. 14 is a flowchart of a process for the print setting extension app to display a print setting screen according to the printer type in a first embodiment.

Next, a process executed by the print setting extension app 312 to display different extended-printing setting screens according to the printing method will be described with reference to the flowchart in FIG. 14. The process shown in FIG. 14 is achieved by the CPU 212 of the client terminal 101 executing a program of the print setting extension app 312. The process shown in FIG. 14 is started when the client terminal 101 is activated.

First, the print setting extension app 312 determines whether the print setting extension app 312 has received an event from the OS 313 (S1401). The OS 313 notifies the print setting extension app 312 of the event at a timing set by the print setting extension app 312 in advance. In this embodiment, in the case where the print setting extension app 312 corresponding to the printer selected in the area 1101 in FIG. 11 is stored, the OS 313 notifies the print setting extension app 312 of the event. The OS 313 may report the event at another timing. For example, the OS 313 may notify the print setting extension app 312 of the event at the timing when "Other settings" 1104 in FIG. 11 is selected. The print setting extension app 312 repeats the process of S1401 until the event is given. In response to receiving the event, the print setting extension app 312 advances the process to S1402.

The print setting extension app 312 acquires information indicating a printing method for the printer corresponding to the selected print queue from the cloud print service 321 (S1402). The process of S1402 is executed when the print setting extension app 312 provides an instruction to the OS 313. The OS 313 acquires the information indicating the printing method for the printer corresponding to the print queue selected by the cloud print service 321 using a command defined by the IPP. For example, the OS 313 acquires setting items and attribute values that allow the type of the printer 104 to be identified, such as Marker-types and Printer-supply, from the cloud print service 321. The information acquired at S1402 may be any other information for determining whether the printer corresponding to the selected print queue is an ink-jet printer or an electrophotographic printer.

The print setting extension app 312 determines whether the OS 313 has completed the acquisition of information indicating the printer printing method from the cloud print service 321 (S1403). The print setting extension app 312 executes the process of S1403 until the acquisition of capability information from the cloud print service 321 is completed.

If the acquisition is completed, the print setting extension app 312 updates the device capability information (S1404). The print setting extension app 312 instructs the OS 313 to update the device capability information with the capability information acquired from the cloud print service 321. Thus, the information on the printer printing method is stored in the device capability information corresponding to the print queue. If information on the printing method is stored in the device capability information, the processes of S1402 to S1404 may be omitted.

After completion of update, the print setting extension app 312 acquires device capability information (S1405). The process S1405 is a process for acquiring a printing method for a printer corresponding to the print queue.

The print setting extension app 312 determines whether the printer corresponding to the selected print queue is an ink-jet printer in accordance with the device capability information received from the OS 313 (S1406). For the determination, a setting item and an attribute value that allow the type of the printer 104 to be identified, such as Marker-types and Printer-supply, are used. For example, if the capability information does not contain the item of Printer-supply, and Ink-Cartridge is acquired from the item of Marker-types, the print setting extension app 312 determines that the printer is an ink-jet printer. In contrast, if the capability information does not contain the item of Ink-Cartridge, and the value of Toner is acquired from the item of Printer-supply, the print setting extension app 312 determines that the printer is an electrophotographic printer. This embodiment determines whether the printer corresponding to the selected print queue is an ink-jet printer. Alternatively, it may be determined whether the printer corresponding to the selected print queue is an electrophotographic printer.

If the printer corresponding to the selected print queue is determined to be an ink-jet printer, the print setting extension app 312 acquires capability information for setting up a print setting screen for an ink-jet printer from the cloud print service 321 (S1407).

FIG. 18A is a table stored in the print setting extension app 312. The table in FIG. 18A is a list of capability information that the print setting extension app 312 acquires when an event notification is given from the OS 313. The individual columns correspond to printers of the individual printing methods, and the individual rows correspond to attribute information which are setting items. The white circles in the table indicate that the print setting extension app 312 acquires capability information on the setting items. The hyphens (-) in the table indicate that the print setting extension app 312 does not acquire capability information on the setting items. For example, if the printer corresponding to the selected print queue is an ink-jet printer, the print setting extension app 312 acquires capability information, such as paper size and paper type, but does not acquire capability information, such as stapling and folding. If the printer corresponding to the selected print queue is an electrophotographic printer, the print setting extension app 312 acquires capability information, such as stapling and folding, but does not acquire capability information on marginless printing. This embodiment specifies setting items for acquiring capability information using a table as shown in FIG. 18A. However, any other method may be employed that allows capability information to be inquired about for items that differ between a case where the printer corresponding to the selected print queue is an ink-jet printer or an electrophotographic printer. At S1407, the print setting extension app 312 inquires about capability information for the items with the white circle with reference to the column of the ink-jet printer of the table.

The capability information includes setting items and attribute values defined by industry-standard specifications and printer-vendor-specific setting items and attribute values for ink-jet printers. The capability information may include duplicate items of the items contained in the capability information acquired by the OS 313.

In contrast, if it is determined that the printer corresponding to the selected print queue is not an ink-jet printer, the print setting extension app 312 acquires capability information using attribute information for electrophotographic printers (S1408). At S1408, the print setting extension app 312 acquires capability information on the setting items with the white circle with reference to the column of the electrophotographic printer in FIG. 18A.

The print setting extension app 312 determines whether the acquisition of capability information from the cloud print service 321 has been completed (S1409). If the acquisition of capability information has not been completed, the print setting extension app 312 performs the process of S1409. In contrast, the acquisition of capability information has been completed, the print setting extension app 312 advances the process to S1410.

The print setting extension app 312 updates the device capability information on the basis of the acquired capability information (S1410). With this operation, in addition to standard setting items, printer-vendor-specific setting items and attribute values regarding ink-jet printers are stored in the device capability information.

The print setting extension app 312 generates an extended-printing setting screen on the basis of print-setting capability information generated from the updated device capability information (S1411).

The print setting extension app 312 displays a print setting screen on the display 216 of the client terminal 101 (S1412). At that time, if the capability information acquired at S1407 is used, the extended-printing setting screens for ink-jet printers as shown in FIGS. 16A to 16C are displayed. In contrast, the capability information acquired at S1408 is used, the extended-printing setting screens for electrophotographic printers as shown in FIGS. 10A to 10D are displayed.

Thus, the print setting extension app 312 can singly display an extended-printing setting screen corresponding to the printer type, as known printer drivers.

Another timing when the print setting extension app 312 acquires information from the cloud print service 321 is as follows:

When the amount of remaining recording agent of the printer, such as ink or toner, becomes low, when a paper jam has occurred in printing, or when paper empty has occurred, the printer notifies the cloud print service 321 of the change in printer status. The change includes that the printer status is an error and changed-status information. In this embodiment, the status information indicates the kind of the error occurring in the printer 104, and so on.

Figure 12A:
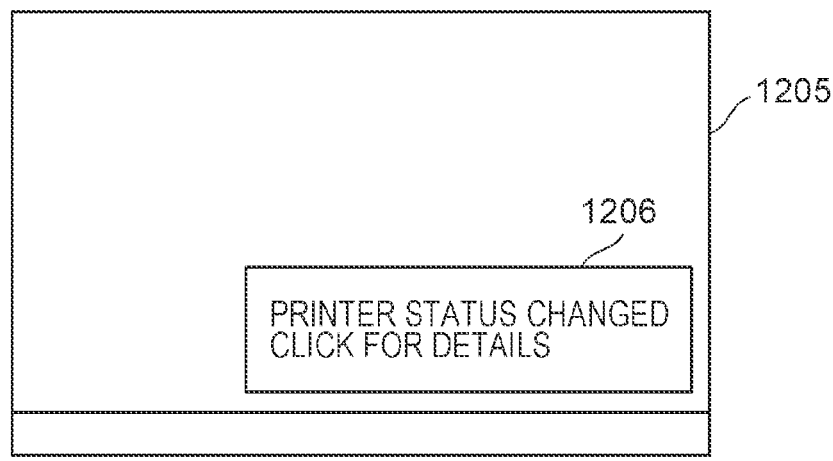
FIGS. 12A to 12D are diagrams illustrating examples of a status screen displayed by the print setting extension app in an embodiment.

If the status of the print queue indicated by the print data received from the client terminal 101 is an error, the cloud print service 321 notifies the client terminal 101 that the status of the printer is an error. The OS 313 of the client terminal 101 displays an object 1206 on a screen 1205 in FIG. 12A in response to the notification from the cloud print service 321. When the user clicks the object 1206, the OS 313 notifies the print setting extension app 312 that the object 1206 is clicked. In response to receiving the notification, the print setting extension app 312 accesses the cloud print service 321 to acquire the printer status information. The print setting extension app 312 displays a status screen illustrated in FIG. 12B or 12C.

Figure 12B:
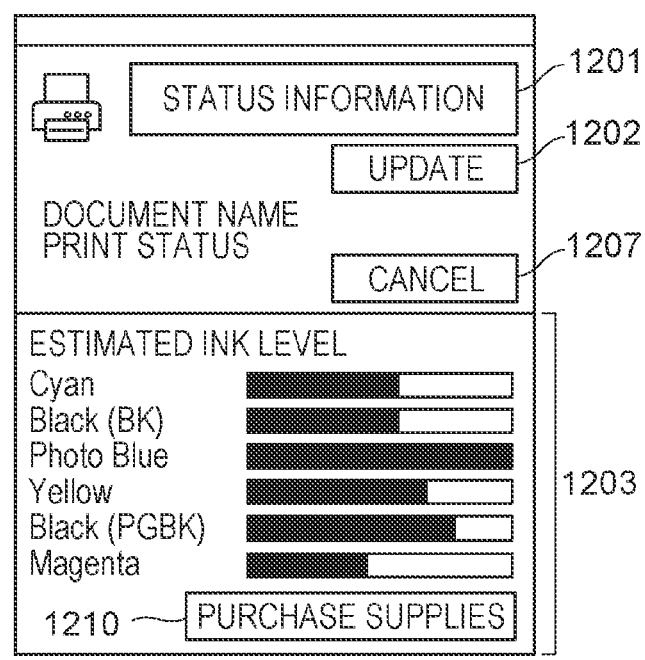

FIG. 12B illustrates an example of a status screen displayed when the printer that has output a status change notification is the ink-jet printer 104a. The status screen displays, in addition to the status information 1201, remaining ink information, a Purchase Supplies button 1210, and so on. The status information 1201 is an area in which a message regarding the status of the printer is displayed. For example, when paper empty has occurred in the printer, a message "Paper has run out. Set paper." is displayed. The message displayed changes according to the current status.

An Update button 1202 is an object for acquiring status information again from the cloud print service 321.

An area 1203 indicates the remaining amounts of inks registered with the cloud print service 321. The print setting extension app 312 acquires the remaining amounts of inks registered with the cloud print service 321 and displays the amounts.

The Purchase Supplies button 1210 is a button for accessing a website for purchasing ink cartridges and paper. Ink-jet printers are supposed to be privately owned, so that users who use the printers and users who purchase consumables, such as ink and paper, are the same in many cases. For this reason, the Purchase Supplies button 1210 is displayed so that the user who has determined that the ink level has become low on the status screen 1203 can purchase consumables, such as ink cartridges, on the spot. When the user selects the Purchase Supplies button 1210, the user can access a Web page that sells consumables. This allows the user to save time and effort to purchase consumables. In this embodiment, the ink-jet printer 104a registers the URL of the consumable purchase site with the cloud print service 321, and the print setting extension app 312 acquires the URL of the consumable purchase site from the cloud print service 321. Alternatively, the print setting extension app 312 may store the URL of the consumable purchase site in advance so that the Purchase Supplies button 1210 can be displayed without the need for acquiring the information from the cloud print service 321.

The cancel button 1207 is an object for terminating the display of the status screen.

Figure 12C:
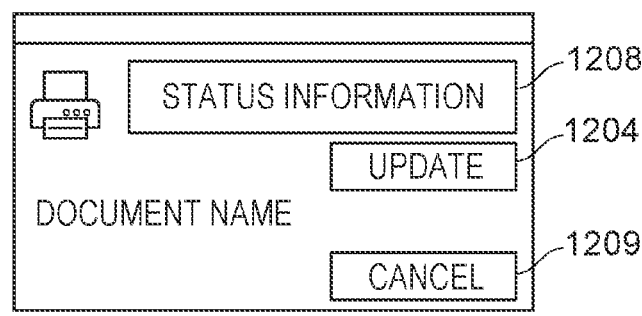

FIG. 12C illustrates an example of a status screen in the case where the printer that has given a status change notification is the electrophotographic printer 104b.

The status information 1208 is the same object as the status information 1201 and displays a message regarding the status of the electrophotographic printer 104b.

An update button 1204 is the same object as the Update button 1202. A Cancel button 1209 is the same object as the Cancel button 1207.

The status screen for electrophotographic printers shown in FIG. 12C does not display the area 1203 that displays remaining consumables information and the Purchase Supplies button 1210. This is because electrophotographic printers are used in corporate offices in many cases, so that users who use the printer for printing and users who purchase consumables differ.

Figure 19:
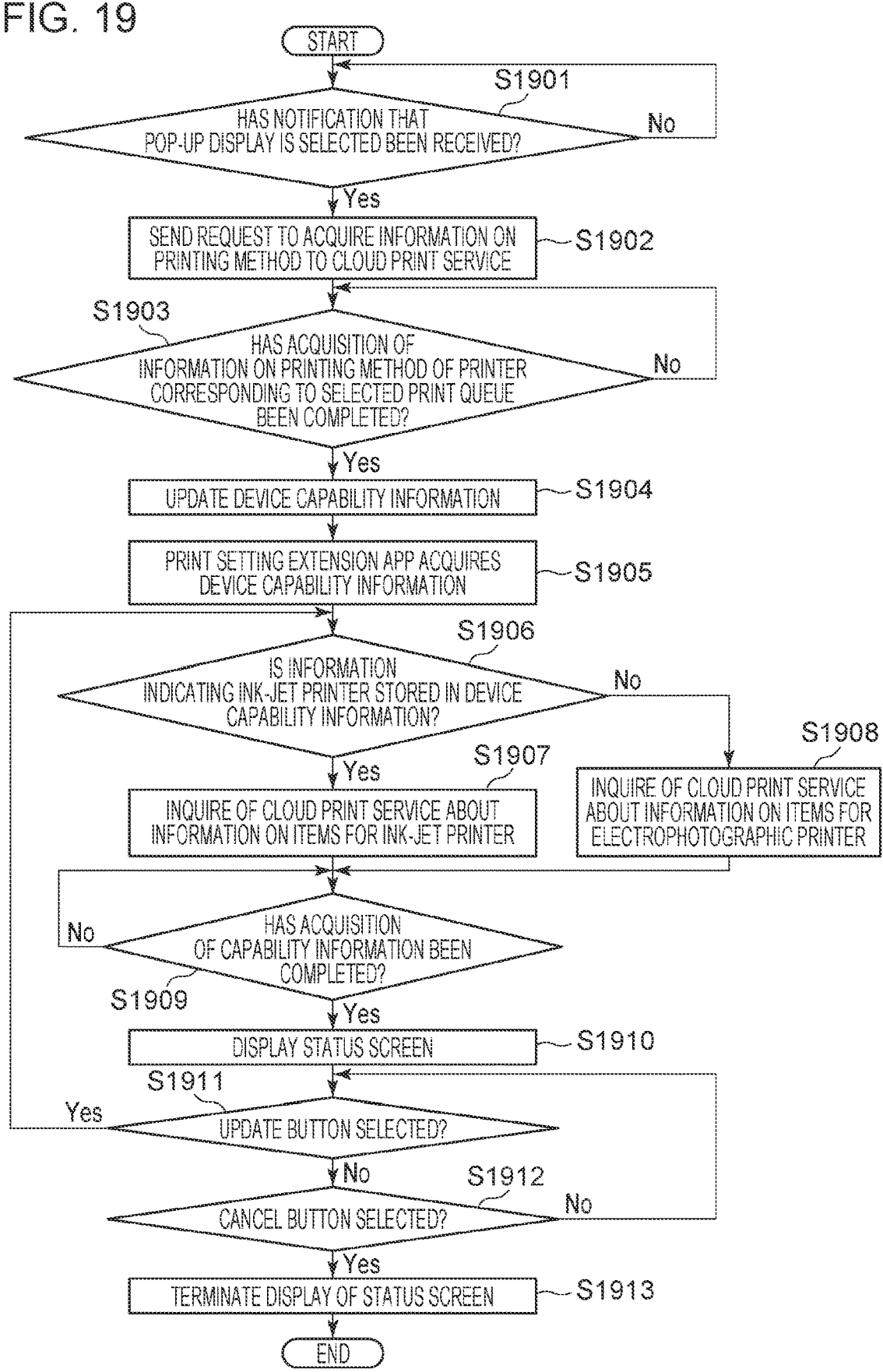
FIG. 19 is a flowchart of a process for the print setting extension app to display a status screen in the first embodiment.

Next, referring to FIG. 19, a process that the print setting extension app 312 executes in displaying the status screen will be described. The process shown in FIG. 19 is achieved by the CPU 212 executing a program of the print setting extension app 312. The process in FIG. 19 is started when the power of the client terminal 101 is turned on.

The print setting extension app 312 determines whether a notification that a pop-up display has been selected has been given from the OS 313 (S1901). The notification given from the OS 313 contains information indicating whether an error has occurred in a printer corresponding to the print queue. If the notification has not been given, the print setting extension app 312 repeats the determination at S1901. If the notification has been given, the print setting extension app 312 executes the process of S1902.

The print setting extension app 312 transmits, to the cloud print service 321, a request to acquire information indicating a printing method for a printer corresponding to the print queue specified on the basis of the notification from the OS 313 (S1902). The process of S1902 is the same as the process of S1402 in FIG. 14.

The print setting extension app 312 determines whether the acquisition of information, from the cloud print service 321, the information indicating the printing method for the printer corresponding to the print queue specified on the basis of the notification from the OS 313 has been completed (S1903). The process of S1903 is the same as the process of S1403 in FIG. 14.

The print setting extension app 312 updates the stored device capability information on the basis of the information received from the cloud print service 321 (S1904). This process is also the same as the process of S1404 in FIG. 14. In the case where information indicating the printing method for the printer is already stored in the device capability information, the print setting extension app 312 may execute the process of S1905 without performing the processes of S1902 to S1904.

The print setting extension app 312 acquires the updated device capability information (S1905).

The process of S1905 is also the same as the process of S1405 in FIG. 14.

The print setting extension app 312 determines whether the device capability information stores the information indicating that the printer corresponding to the print queue is an ink-jet printer (S1906). The process of S1906 is the same as the process of S1406 in FIG. 14. When the printing method specified from the device capability information is an ink-jet method, the print setting extension app 312 executes the process of S1907.

The print setting extension app 312 acquires status information on the printer with reference to the table shown in FIG. 18B (S1907). FIG. 18B is a table showing information that the print setting extension app 312 acquires from the cloud print service 321 in displaying a status screen. The columns show printing methods, and the rows show acquisition information. The white circle indicates that the information is to be acquired, and the hyphen indicates that the information is not to be acquired. The print setting extension app 312 acquires the status, the remaining recording agent, and the URL of the consumable purchase site of the printer from the cloud print service 321.

In contrast, if the printing method specified from the device capability information at S1906 is not an ink-jet method, the print setting extension app 312 executes the process of S1908.

The print setting extension app 312 acquires printer status information with reference to the table in FIG. 18B (S1908). The print setting extension app 312 acquires the printer status information from the cloud print service 321 with reference to the column of the electrophotographic printer in FIG. 18B. In this case, the print setting extension app 312 does not acquire information on the remaining recording agent and the URL of the consumable purchase site.

The print setting extension app 312 determines whether the acquisition of printer information has been completed (S1909). If the acquisition of printer information has not been completed, the print setting extension app 312 executes the process of S1909. If the acquisition of printer information has been completed, the print setting extension app 312 executes the process of S1910.

The print setting extension app 312 generates a status screen based on the acquired information and displays the status screen (S1910). Executing the process of S1910 causes the status screen shown in FIG. 12B or FIG. 12C to be displayed.

The print setting extension app 312 determines whether an update button has been selected (S1911). The print setting extension app 312 determines whether the update button 1202 in FIG. 12B or the update button 1204 in FIG. 12C has been selected (S1911). If the update button has been selected, the print setting extension app 312 returns the process to S1906. If the update button has not been selected, the print setting extension app 312 executes the process of S1912.

The print setting extension app 312 determines whether a cancel button has been selected (S1912). If the cancel button 1207 in FIG. 12C or the cancel button 1209 in FIG. 12B has been selected, the print setting extension app 312 advances the process to S1913. If the cancel button has not been selected, the print setting extension app 312 returns the process to S1911. If a button other than the above button has been selected in the process from S1910 to S1911 or in the process from S1911 to S1912, the print setting extension app 312 executes a process corresponding to the selected button. For example, when the Purchase Supplies button 1210 is selected, the print setting extension app 312 activates a Web browser installed in the client terminal 101 to execute a process for accessing a URL associated with the button.

The print setting extension app 312 terminates the display of the status screen (S1913). The process of this flowchart is terminated by executing S1913. After the process of FIG. 19 ends, the print setting extension app 312 returns the process to the start point of this processing procedure.

Executing the process of FIG. 19 allows the items of printer information that the print setting extension app 312 acquires from the cloud print service 321 to be changed, enabling a status screen corresponding to the printing method to be displayed.

The above embodiment shows a case in which the print setting extension app 312 acquires capability information and transmits print data to the printer 104 via the cloud print service 321. Alternatively, the print setting extension app 312 may communicate capability information and print data directly to the printer 104.

Second Embodiment

The first embodiment shows an example in which an ink-jet printer and an electrophotographic printer registered with the cloud print service 321 are supported by one print setting extension app 312.

A second embodiment shows a case in which one printer is connected to the client terminal 101 not via a cloud print service.

In the second embodiment, the ink-jet printer 104a in FIG. 1 is connected to the client terminal 101 not via a cloud print service. In contrast, the electrophotographic printer 104b communicates with the client terminal 101 via the cloud print service, as in the first embodiment.

In the second embodiment as well, in the case where the ink-jet printer 104a and the electrophotographic printer 104b are not distinguished, the term "printer 104" is used. In the second embodiment, the print setting extension app 312 supports both the ink-jet printer 104a and the electrophotographic printer 104b.

Since FIG. 1 to FIG. 13B are the same as in the first embodiment, descriptions thereof will be omitted.

First, a method for registering a printer not via the cloud print service 321 will be described.

Directly connecting the client terminal 101 and the ink-jet printer 104a requires that the client terminal 101 and the ink-jet printer 104a are in the same network or directly connected together with a universal serial bus (USB) cable, a LAN cable, or the like.

The screen shown in FIG. 4 is displayed on the client terminal 101, with the client terminal 101 and the ink-jet printer 104a connected to the same network. When the object 401 is selected, the client terminal 101 searches for a connectable printer. The ink-jet printer 104a responds to it. When the user selects the ink-jet printer 104a that is displayed as a search result, information on the ink-jet printer 104a and information on the local printer driver 320 are associated with each other.

The OS 313 acquires the printer information on the selected ink-jet printer 104a.

The printer information acquired here is the HWID or COID of the printer 104a. In addition, the OS 313 transmits a request to acquire capability information to the ink-jet printer 104a. The capability information acquired in response to the request is only about setting items set in the OS 313 in advance, and capability information on vendor-specific setting items is not acquired.

The OS 313 generates a print queue based on the acquired printer information and capability information. The OS 313 installs a print setting extension app specified on the basis of the HWID and COID of the ink-jet printer 104a and associates the print setting extension app with the print queue. If the print setting extension app 312 has already been installed, the OS 313 does not additionally install an additional print setting extension app but only performs association with the print queue.

Thus, the print queue of the ink-jet printer 104a is generated, and printer information and the print setting extension app 312 are associated with the print queue.

Next, a processing procedure for transmitting print data from the client terminal 101 to the printer 104 will be described. The method for transmitting print data from the client terminal 101 to the electrophotographic printer 104b via the cloud print service 321 is the same as the method of the first embodiment, and a description whereof will be omitted.

Figure 17A:
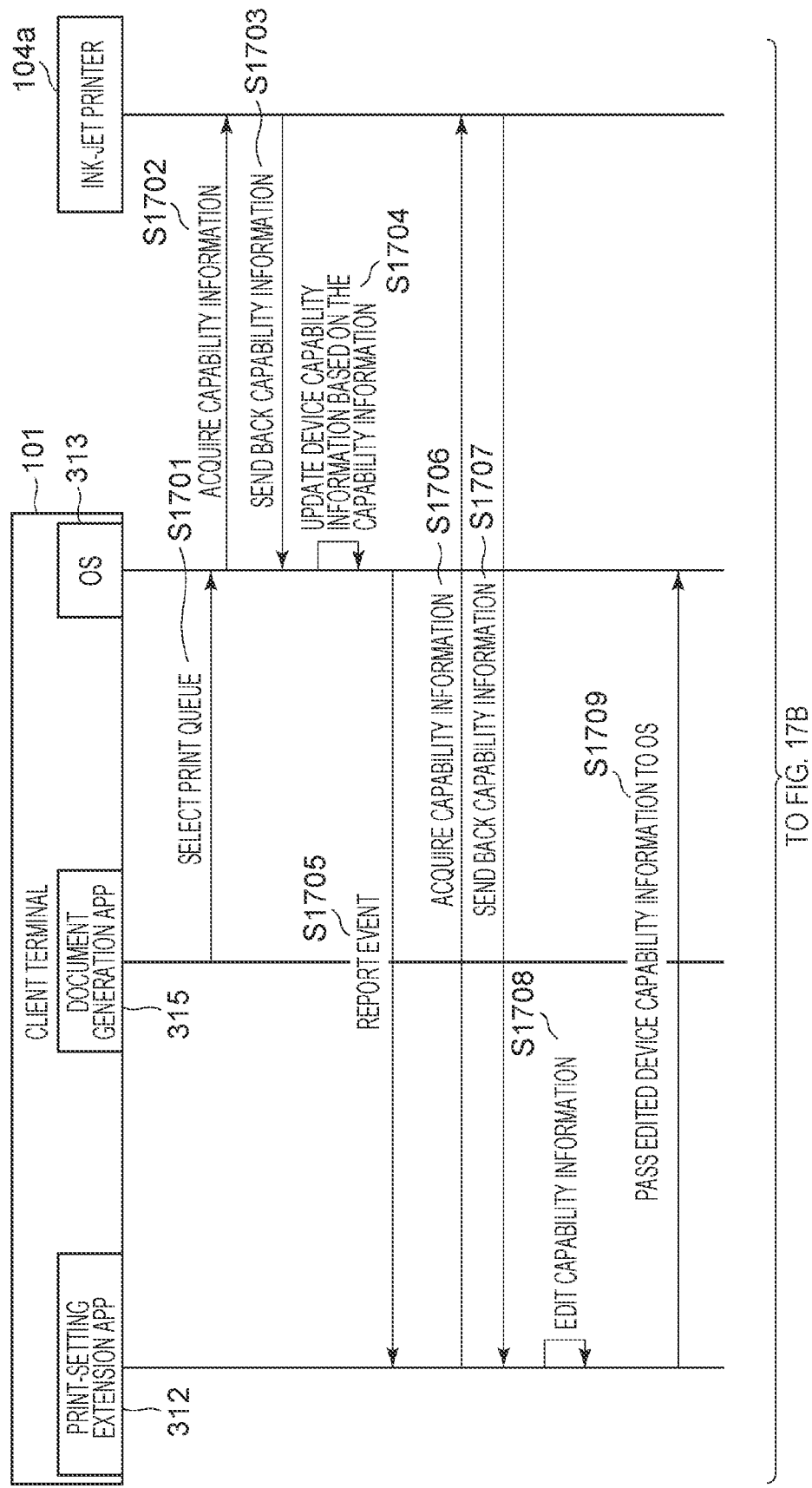
FIGS. 17A and 17B illustrate a sequence chart of an example of a printer registering process not via a cloud print service in the second embodiment.
Figure 17B:
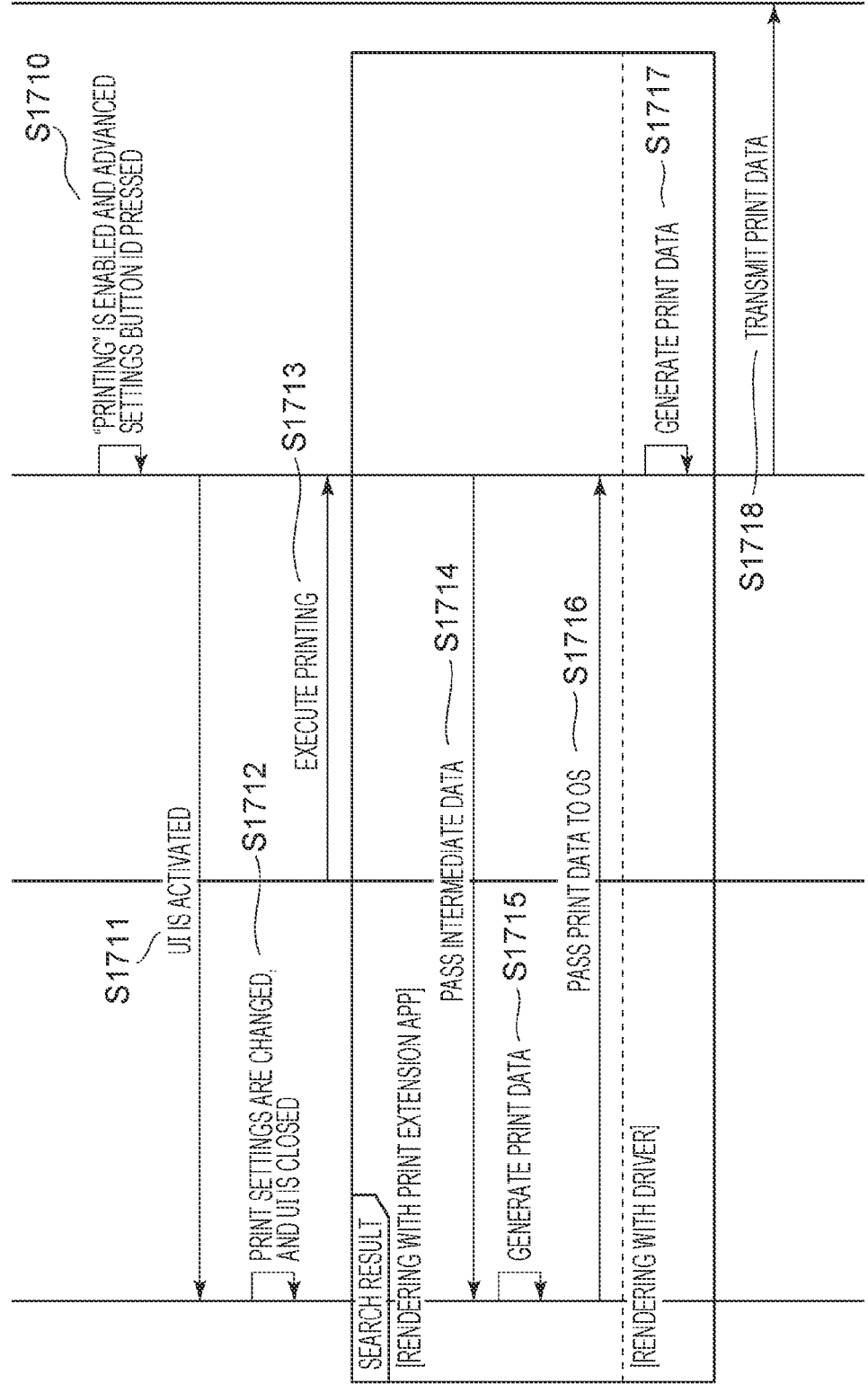

Referring to FIGS. 17A and 17B, a process for transmitting print data from the client terminal 101 to the ink-jet printer 104a not via a cloud print service will be described.

Examples of the document generation app 315 include a document-data generation application, a presentation-material generation application, and a picture/image-data display application.

The document generation app 315 displays a print setting screen (FIG. 11) for selecting a print queue as a print-setting initial screen. In this embodiment, the print-setting initial screen is displayed by the document generation app 315. Alternatively, the OS 313 may display a similar screen. The print-setting initial screen displays an object 1101 for selecting a print queue, an object 1102 for performing various print settings, and a print preview screen 1103.

The OS 313 selects a print queue associated with a printer that is set as a default printer (S1701). In this embodiment, a printer 104 that is not connected to the cloud is selected as a default printer. The processes from S1701 onward are executed also when the user operates the object 1101 to change the print queue.

Next, the OS 313 inquires of the ink-jet printer 104a about capability information (S1702). Which setting item of the capability information is inquired about is determined in advance by the specifications of the OS 313. The inquiry is made to the printer 104 using a command based on a standard protocol defined by an IPP, such as Get-print-Attributes. If Get-print-Attributes is used, capability information determined by the OS 313 is inquired about in a list format.

The ink-jet printer 104a responds to the capability information list sent with Get-print-Attributes to the OS 313 (S1703). For example, suppose the attribute of media size is designated by Get-print-Attributes (IPP). If the cloud print service 321 holds the attribute of media size, the cloud print service 321 sends back values (A4, B5, Letter, and so on) associated with the attribute. If the attribute designated with Get-print-Attributes is not present in the queue of the printer 104, the printer 104 does not send back an associated value. The capability information acquired at S1503 is capability information inquired regardless of the type and capabilities of the printer to which the OS 313 is connected.

The OS 313 updates the device capability information using the capability information acquired from the ink-jet printer 104a. The OS 313 adds the capability information acquired at S1503 of FIG. 15A to the device capability information generated at S3012 of FIG. 3A (S1704). If the device capability information is to be updated, the device capability information managed by the client terminal 101 can be updated by performing S1503. In the update of device capability information at S1704, only the attribute value defined by industry-standard specifications is updated.

Next, the OS 313 notifies the print setting extension app 312 of an event and an API for use in editing the device capability information (S1705). The event notification timing is registered when the print setting extension app 312 is installed in the OS 313 of the client terminal 101.

In response to receiving the event, the print setting extension app 312 transmits a request to acquire capability information to the ink-jet printer 104a. The capability information acquired here is capability information for writing setting items and attribute values that are specifically defined by the printer vendor to the device capability information.

In response to receiving the event from the OS 313, the print setting extension app 312 inquires about capability information on the ink-jet printer 104a (S1706). At that time, the print setting extension app 312 inquires of the ink-jet printer 104a about capability information on setting items specific to the printer vendor and setting items containing attribute values specific to the printer vendor. The inquiry is made using Get-print-Attributes as at S1502 of FIG. 15A, in which the item name of a setting item is specified so that capability information is acquired. In this embodiment, the capability information is acquired at S1506 for setting items that are specifically defined by the printer vendor and setting items including attribute values that are specifically defined by the printer vendor. The capability information acquired may contain the setting items acquired by the OS 313.

In response to receiving an inquiry about specific capability information from the ink-jet printer 104*a*, the print setting extension app 312 responds to the print setting extension app 312 (S1707). The method of response is the same as at S1503 of FIG. 15A described above. In this embodiment, the ink-jet printer 104*a* sends back capability information held by the ink-jet printer 104*a* at S1507.

The processes of S1508 to S1517 are the same as the corresponding blocks from S808 to S817 in FIGS. 8A and 8B, and descriptions thereof will be omitted.

The OS 313 transmits the print data and print capability information passed from the print setting extension app 312 or the print data and print capability information generated by the OS 313 to the ink-jet printer 104*a* via a print queue (S1718).

This is the processing procedure for transmitting print data to the ink-jet printer 104*a* not via the cloud print service 321.

In the second embodiment, as in the first embodiment, the extended-printing setting screen that the print setting extension app 312 displays differs between a case where a print queue associated with the ink-jet printer 104*a* is selected and a case where a print queue associated with the electrophotographic printer 104*b* is selected. If a print queue associated with the ink-jet printer 104*a* is selected, the print setting extension app 312 displays the extended-printing setting screen shown in FIGS. 16A to 16C. In contrast, if a print queue associated with the electrophotographic printer 104*b* is selected, the print setting extension app 312 displays the extended-printing setting screen shown in FIGS. 10A to 10D.

Figure 15A:
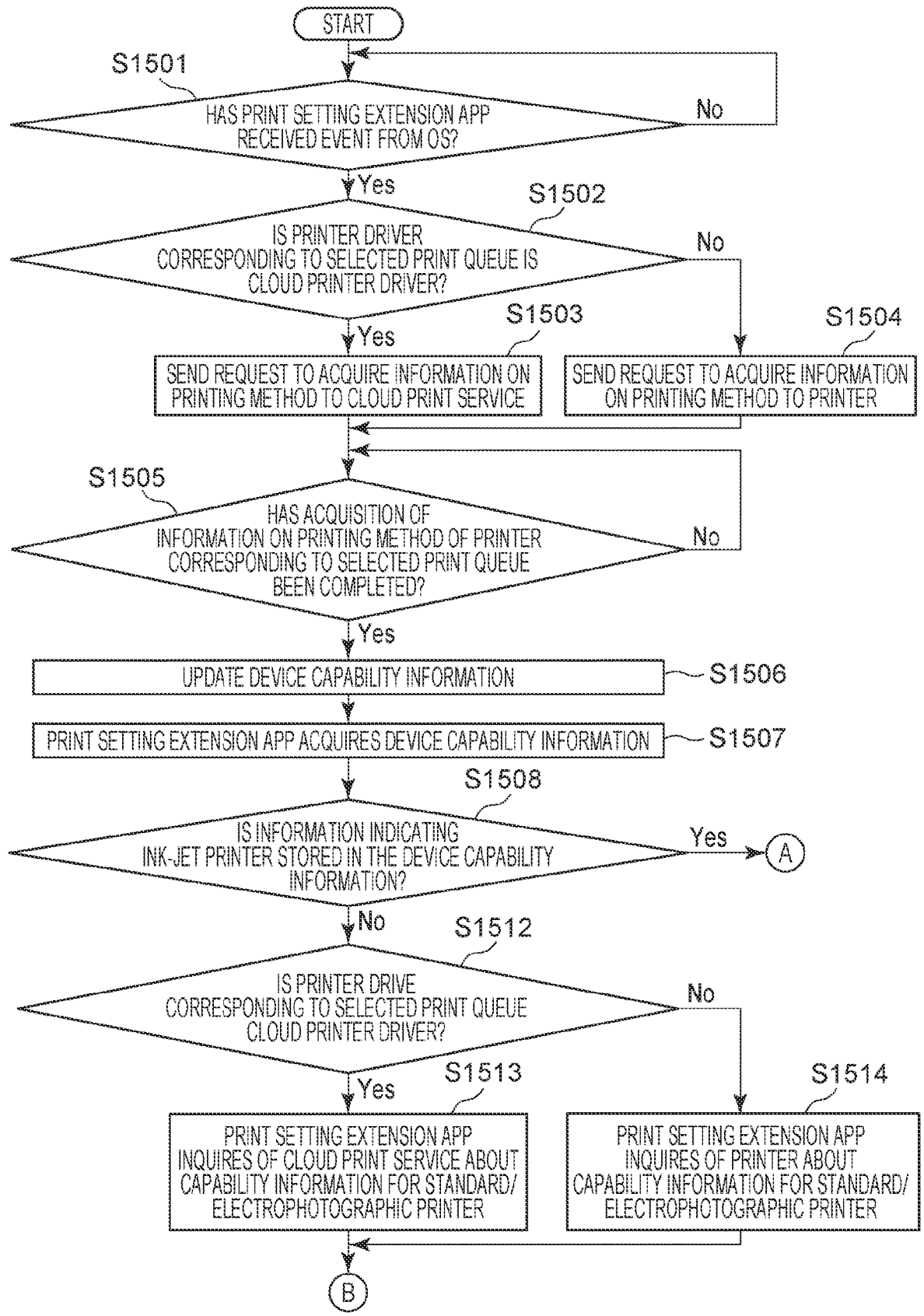
FIGS. 15A and 15B illustrate a flowchart of a process for the print setting extension app to display a print setting screen according to a method of connection with the printer in a second embodiment.
Figure 15B:
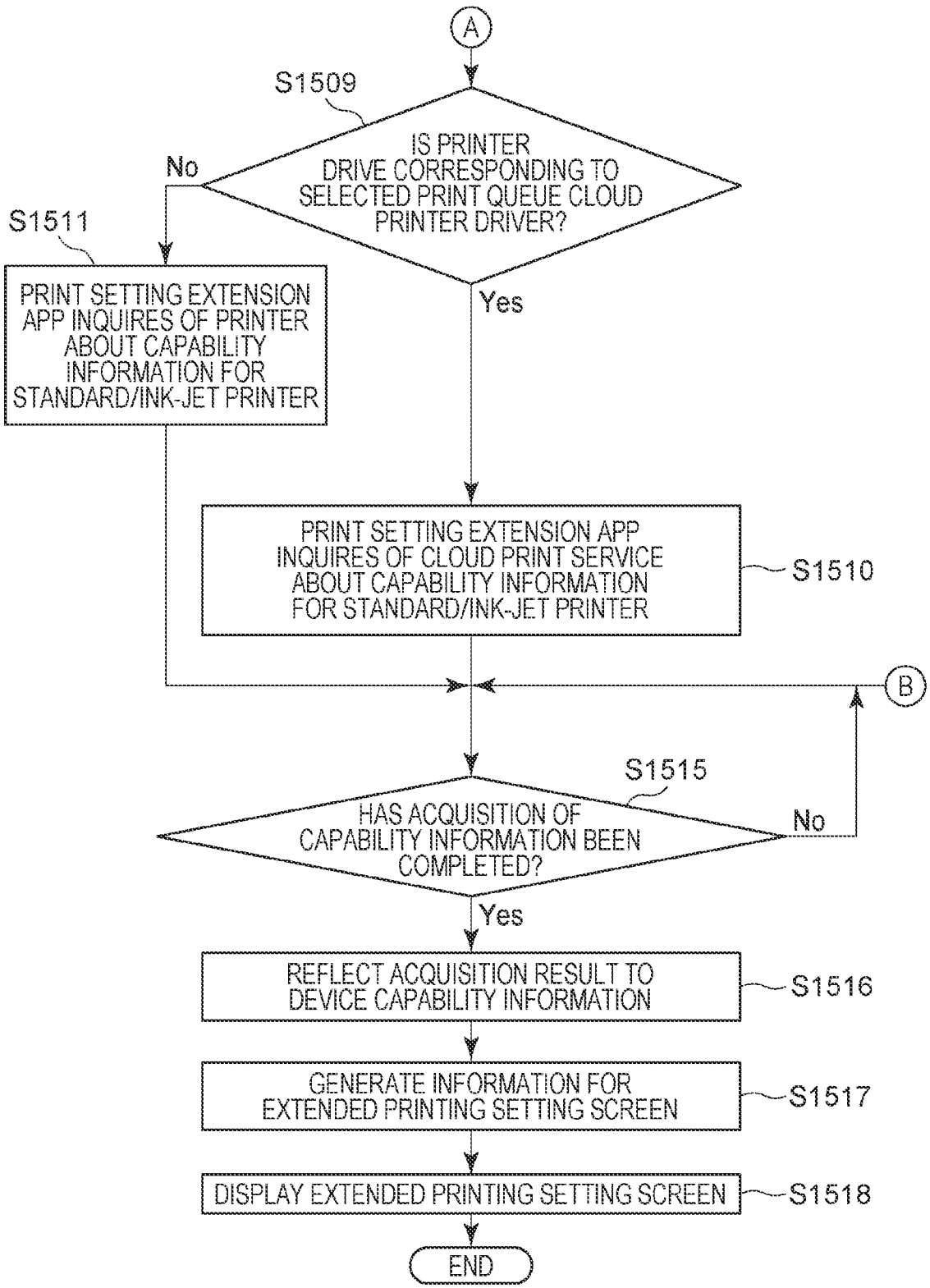

FIGS. 15A and 15B show a flowchart for a process whereby the print setting extension app 312 displays an extended-printing setting screen in the second embodiment. The process shown in FIGS. 15A and 15B is implemented by the CPU 212 of the client terminal 101 executing a program of the print setting extension app 312. The flowchart shown in FIGS. 15A and 15B is started when the power of the client terminal 101 is turned on.

The print setting extension app 312 determines whether an event has been given from the OS 313 (S1501). The OS 313 notifies the print setting extension app 312 of the event at a timing set by the print setting extension app 312 in advance. In this embodiment, the OS 313 notifies the print setting extension app 312 of the event in the case where the print setting extension app 312 corresponding to the printer selected in the area 1101 in FIG. 11 is stored. The OS 313 may report the event at another timing. For example, the OS 313 may notify the print setting extension app 312 of the event at the timing when "Other settings" 1104 in FIG. 11 is selected. The print setting extension app 312 repeats the process of S1501 until the event is given. In response to receiving the event, the print setting extension app 312 advances the process to S1502.

The print setting extension app 312 determines whether the printer driver associated with the selected print queue is the cloud printer driver 311 (S1502). For the determination, the print setting extension app 312 acquires information indicating whether the registered driver is the cloud printer driver 311 or the local printer driver 320 using driver information stored in the storage 214 in FIG. 2A. This embodiment determines whether the printer driver corresponding to the print queue is the cloud printer driver 311. Alternatively, it may be determined whether the printer driver corresponding to the print queue is the local printer driver 320.

In response to determining that the cloud printer driver 311 is associated with the print queue, the print setting extension app 312 executes the process of S1503.

The print setting extension app 312 acquires information indicating a printing method for a printer corresponding to the selected print queue from the cloud print service 321 (S1503). The print setting extension app 312 instructs the OS 313 to transmit a request to acquire the printing method for the printer to the cloud print service 321.

In contrast, if it is determined that the local printer driver 320 is associated, the print setting extension app 312 executes the process of S1504. The print setting extension app 312 acquires information indicating the printing method for the printer corresponding to the selected print queue from the printer associated with the local printer driver 320 (S1504). The print setting extension app 312 transmits a request to acquire the printing method for the ink-jet printer 104*a* to the OS 313. The OS 313 acquires the information on the printing method for the ink-jet printer 104*a* from the ink-jet printer 104*a* using the IP address of the ink-jet printer 104*a* registered with the print queue.

The method for acquiring the information on the printing method is the same as the method of the first embodiment. For acquiring the printing method directly from the printer, the same attributes as in acquiring the printing method from the cloud print service are used.

The print setting extension app 312 determines whether the acquisition of information indicating the printing method for the printer corresponding to the selected print queue has been completed (S1505). If the acquisition of the information indicating the printing method has not been completed, the print setting extension app 312 executes the process of S1505 again. In contrast, if the acquisition of the information indicating the printing method has been completed, the print setting extension app 312 advances the process to S1506.

The print setting extension app 312 updates the device capability information based on the information acquired at S1503 or S1504 (S1506). The print setting extension app 312 instructs the OS 313 to update the device capability information. Thus, the printing method for the printer associated with the print queue is stored in the device capability information. If the printing method is already stored in the capability information on the printer corresponding to the selected print queue, the processes of S1502 to S1506 may be omitted, and the print setting extension app 312 may execute S1507 after S1501.

The print setting extension app 312 acquires the device capability information (S1507).

The print setting extension app 312 determines whether the printer corresponding to the selected print queue is an ink-jet printer on the basis of the device capability information received from the OS 313 (S1508). The second embodiment determines whether the printer corresponding to the selected print queue is an ink-jet printer. Alternatively, it may be determined whether the printer corresponding to the selected print queue is an electrophotographic printer. The determination method is the same as the method of the first embodiment, and a description thereof will be omitted.

If the printer corresponding to the selected print queue is an ink-jet printer, the process goes to S1509.

The print setting extension app 312 determines whether the printer driver corresponding to the selected print queue is the cloud printer driver 311 (S1509). The process of S1509 is the same as the process of S1502.

If the printer driver corresponding to the selected print queue is the cloud printer driver 311, the print setting extension app 312 executes the process of S1510.

The print setting extension app 312 inquires of the cloud print service 321 about the printer capability information (S1510). The process of S1510 is executed by the print setting extension app 312 instructing the OS 313 to acquire capability information. In this case, the OS 313 acquires capability information about printer-vendor specific attributes, in addition to standard capability information. At S1510, the print setting extension app 312 acquires capability information on the setting items with a white circle in the column of the ink-jet printer with reference to the table shown in FIG. 18A.

If the printer driver corresponding to the selected print queue is the local printer driver 320, the print setting extension app 312 executes the process of S1511.

The print setting extension app 312 directly inquires of the printer associated with the local printer driver 320 about capability information (S1511). The process of S1511 is implemented by the print setting extension app 312 instructing the OS 313 to acquire capability information. In this case, the OS 313 acquires capability information on printer-vendor specific attributes in addition to standard capability information. For example, OS 313 acquires capability information about the setting items with the white circle in the column of the ink-jet printer in FIG. 18A.

At S1510 and S1511, the capability information inquired about is the same, although the destinations of the inquiries differ.

If at S1508 the acquired device capability information does not contain information indicative of an ink-jet printer, the print setting extension app 312 performs the process of S1512. Since the process of S1512 is the same as the processes of S1502 and S1509, a description thereof will be omitted.

If the printer driver corresponding to the selected print queue is the cloud printer driver 311, the print setting extension app 312 inquires of the cloud print service 321 about printer capability information (S1513). The process of S1513 is implemented by the print setting extension app 312 instructing the OS 313 to acquire capability information. At S1513, the print setting extension app 312 acquires capability information about the setting items with a white circle in the column of the electrophotographic printer in FIG. 18A.

In contrast, if the printer driver corresponding to the selected print queue is a local print driver, the print setting extension app 312 directly transmits a request to acquire capability information to the electrophotographic printer (S1514). The process of S1514 is implemented by the print setting extension app 312 instructing the OS 313 to acquire capability information. At S1514, the print setting extension app 312 acquires capability information about the setting items with a white circle in the column of the electrophotographic printer in FIG. 18A.

The processes of S1516 to S1518 are the same as the processes of S1410 to S1412 in FIG. 14, and descriptions thereof will be omitted.

Thus, the capability information can be acquired regardless of the connection status of the printer 104, so that a print setting extended screen according to the printer type can be displayed.

In this embodiment, the print setting extension app 312 determines at S1502 and S1509 whether the printer driver corresponding to the selected print queue is a cloud printer driver or a local printer driver. Then, the destination of the capability-information acquisition request is changed according to the determination. Alternatively, the print setting extension app 312 may specify a print queue and requires the OS 313 to acquire capability information, and the OS 313 may change the destination of the capability information-acquisition request according to the type of the printer driver corresponding to the specified print queue.

Next, display of the status screen will be described.

If the status of the printer 104 is an error when the client terminal 101 transmits print data to the printer 104, the printer transmits an error notification to the client terminal 101. The printer 104 notifies the cloud print service 321 of the error and status information indicating the details of the error. If the status of the printer 104 corresponding to a print queue specified by print data transmitted from the client terminal 101 to the cloud print service 321 is an error, the cloud print service 321 notifies the client terminal 101 of the error.

Figure 12D:
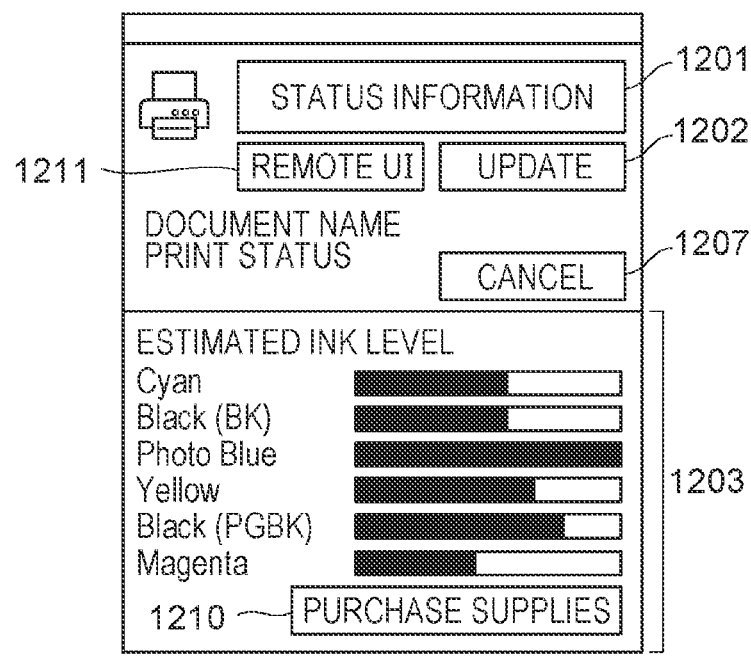

When a status change notification is sent from the printer 104 or the cloud print service 321, the client terminal 101 displays a pop-up screen. The pop-up screen displayed here is a screen as in FIG. 12A, as in the first embodiment. A status screen displayed when the printer that has transmitted the notification is the electrophotographic printer 104b is also a screen as in FIG. 12C, as in the first embodiment. If the printer that has transmitted the notification is the ink-jet printer 104a that bypasses the cloud print service 321, a status screen as in FIG. 12D is displayed. The difference from the first embodiment is that a Remote UI button 1211 is displayed. The Remote UI button 1211 is an object for accessing a Web server function of the ink-jet printer 104a through the Web browser of the client terminal 101. If the Remote UI button 1211 is selected, the print setting extension app 312 activates the Web browser of the client terminal 101 to access a URL reported from the ink-jet printer 104a. The Remote UI allows determination of the status information on the ink-jet printer 104a, the network setting of the main body, job settings, the job history, and so on.

Figure 20B:
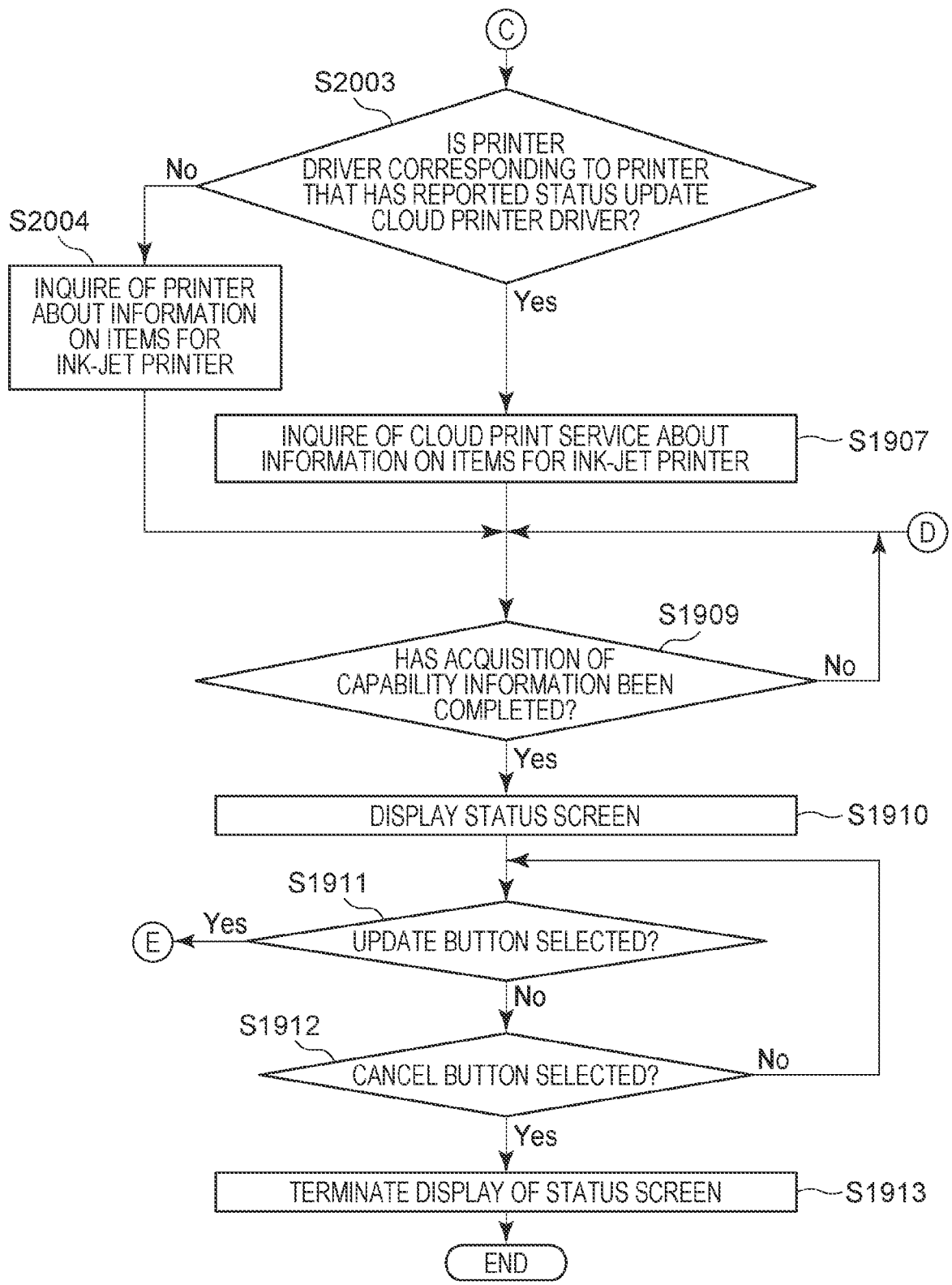

Referring to FIGS. 20A and 20B, a process for displaying a status screen in the second embodiment will be described. The process shown in FIGS. 20A and 20B is implemented by the CPU 212 executing a program of the print setting extension app 312. The flowchart shown in FIGS. 20A and 20B is started when the power of the client terminal 101 is turned on. The same processes as in the first embodiment are given the same reference signs as in FIG. 19, and descriptions thereof will be omitted.

The print setting extension app 312 determines whether the printer driver corresponding to the printer whose status notification has been updated is a cloud printer driver (S2001). If the print driver is a cloud printer driver, the print setting extension app 312 executes the process of S1902. If not, the print setting extension app 312 transmits a request to acquire information indicating the printing method to the printer (S2002). The process is the same as the process of S1504 in FIG. 15A. If the printing method is already stored in the device capability information on the printer, the processes of S2001 to S1904 may be omitted.

Next, the print setting extension app 312 executes the processes of S1903 to S1906.

At S2003, the print setting extension app 312 determines whether a printer driver corresponding to the printer that has given the status notification is a cloud printer driver.

If the corresponding driver is a cloud printer driver, the print setting extension app 312 executes the process of S1907. If the corresponding driver is a local printer driver, the print setting extension app 312 transmits an inquiry about printer information to the printer connected to the client terminal 101 (S2004). The process S2004 is implemented by the print setting extension app 312 instructing the OS 313 to acquire printer information. The printer information acquired at S2004 is the items with the white circle in the column of the ink-jet printer in FIG. 18B plus a URL for displaying the Remote UI.

At S2005, the print setting extension app 312 determines whether the printer driver corresponding to the printer that has given the status notification is a cloud printer driver.

If the printer driver is a cloud printer driver, the print setting extension app 312 executes the process of S1908. If the printer driver is a local printer driver, the print setting extension app 312 transmits an inquiry about printer information to a printer connected to the client terminal (S2006). The process S2006 is implemented by the print setting extension app 312 instructing the OS 313 to acquire printer information. The printer information acquired at S2006 is the items with the white circle in the column of the electrophotographic printer in FIG. 18B.

Next, the print setting extension app 312 executes the processes of S1909 to S1913 and terminates the process in the flowchart. If the Remote UI button 1211 is operated during the processes of S1910 to S1912, the print setting extension app 312 activates the Web browser of the client terminal 101 to access the URL acquired at S2004.

In FIGS. 20A and 20B, at the processes of S2001, S1902, and S2002, the print setting extension app 312 determines the type of the printer driver corresponding to the printer that has reported update of status information and switches the destinations of the information acquisition request. Those processes may be executed by the OS 313. In this case, the print setting extension app 312 notifies the OS 313 of the print queue corresponding to the printer that has reported the status update and information to be acquired. The OS 313 determines whether the printer driver associated with the print queue reported from the print setting extension app 312 is a cloud printer driver or a local printer driver and switches the destinations of the information acquisition request.

For S2003 to S2006, S1907, and S1908 as well, the print setting extension app 312 may notify the OS 313 of the print queue whose status update is reported and the kind of information to be acquired. The OS 313 may determine whether the printer driver corresponding to the print queue reported from the print setting extension app 312 is a cloud printer driver or a local printer driver and switch the destinations of the information acquisition request.

Executing the process shown in FIGS. 20A and 20B allows the kind of information acquired from the printer 104 and the cloud print service 321 to be changed according to the printing method and the connecting method.

In the second embodiment, the ink-jet printer 104a connects to the client terminal 101 not via the cloud print service 321, and the electrophotographic printer 104b connects to the client terminal 101 via the cloud print service 321.

Alternatively, the ink-jet printer 104a and the client terminal 101 may be connected via the cloud print service, and the electrophotographic printer 104b and the client terminal 101 may be connected not via the cloud print service.

Both the ink-jet printer 104a and the electrophotographic printer 104b may be connected directly to the client terminal 101 without using the cloud print service 321.

In any case, the present invention can be applied to a case in which the ink-jet printer 104a and the electrophotographic printer 104b display an extended-printing setting screen using one print setting extension app 312.

The application according to an embodiment of the present invention allows inquiry about printer information suitable for the type of a printer associated with a general-purpose printer driver.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-143536, filed Sep. 9, 2022, which is hereby incorporated by reference herein in its entirety.

What is claimed is:

1. A non-transitory computer-readable storage medium storing an application to be installed in an information processing apparatus, the application when executed on the information processing apparatus causes the information processing apparatus to:
   acquire a printing method of a printer;
   acquire, in a case where the acquired printing method is a first method, printer information regarding a predetermined item; and
   display an object based on the acquired printer information on a display,
   wherein, in a case where the acquired printing method is a second method, the information processing apparatus does not acquire the printer information regarding the predetermined item.

2. The non-transitory computer-readable storage medium according to claim 1, wherein the application comprises an application associated with a printer driver configured to generate print data printable with printers of a plurality of vendors.

3. The non-transitory computer-readable storage medium according to claim 1, wherein the printer information comprises information on a function available at the printer.

4. The non-transitory computer-readable storage medium according to claim 3, wherein the object comprises an object for setting a setting value regarding the function.

5. The non-transitory computer-readable storage medium according to claim 1, wherein the printer information comprises information on a status of the printer.

6. The non-transitory computer-readable storage medium according to claim 5, wherein the information on the status of the printer comprises information on a remaining amount of a recording agent that is used by the printer in printing.

7. The non-transitory computer-readable storage medium according to claim 6, wherein the object comprises an object that displays the remaining amount of the recording agent.

8. The non-transitory computer-readable storage medium according to claim 1, wherein the application comprises an application specified based on information identifying a type of the printer.

9. A method for controlling an information processing apparatus in which an application for printing is installed, the method comprising:
acquiring a printing method of a printer;
acquiring, in a case where the acquired printing method is a first printing method, printer information regarding a predetermined item,
controlling the information processing apparatus to display an object based on the acquired printer information on a display, and
controlling the information processing apparatus, when the acquired printing method is a second printing method, to display another object regarding the printer without acquiring the printer information regarding the predetermined item.

10. A non-transitory computer-readable storage medium storing a program that when executed on the information processing apparatus causes the information processing apparatus to perform the method according to claim 9.

11. The method according to claim 9, wherein the application comprises an application associated with a printer driver configured to generate print data printable with printers of a plurality of vendors.

12. The method according to claim 9, wherein the printer information comprises information on a function available at the printer.

13. The method according to claim 12, wherein the object comprises an object for setting a setting value regarding the function.

14. The method according to claim 9, wherein the printer information comprises information on a status of the printer.

15. The method according to claim 14,
wherein the information on the status of the printer comprises information on a remaining amount of a recording agent that is used by the printer in printing, and
wherein the object comprises an object that displays the remaining amount of the recording agent.

16. The method according to claim 9, wherein the application comprises an application specified based on information identifying a type of the printer.

17. An information processing apparatus in which an application for printing is installed, the information processing apparatus comprising:
a first acquisition unit configured to acquire a printing method of a printer;
a second acquisition unit configured to, in a case where the acquired printing method is a first printing method, acquire printer information regarding a predetermined item;
a first control unit configured to display an object based on the acquired printer information on a display, and
a second control unit configured to, in a case where the acquired printing method is a second printing method, display another object regarding the printer without acquiring the printer information regarding the predetermined item.

* * * * *